United States Patent

Kohno et al.

[11] Patent Number: 5,956,200
[45] Date of Patent: Sep. 21, 1999

[54] METHOD OF AND APPARATUS FOR CONTROLLING MAGNETIC DISC DRIVE

[75] Inventors: Keiichi Kohno, Kawasaki; Tsuyoshi Takahashi; Masayoshi Ishii, both of Higashine; Yoshiyuki Nagasaka, Kawasaki; Tamotsu Kozuka, Kawasaki; Susumu Yoshida, Kawasaki, all of Japan

[73] Assignee: Fujitsu Limited, Kawasaki, Japan

[21] Appl. No.: 08/609,460

[22] Filed: Mar. 1, 1996

Related U.S. Application Data

[62] Division of application No. 08/370,417, Jan. 9, 1995, abandoned.

[30] Foreign Application Priority Data

Jan. 27, 1994 [JP] Japan .................................. 6-024697

[51] Int. Cl.⁶ .................................................. G11B 5/596
[52] U.S. Cl. ...................................... 360/77.04; 360/78.04
[58] Field of Search .............................. 360/78.04, 77.01, 360/77.02, 77.04, 78.06, 78.07, 78.09, 78.12

[56] References Cited

U.S. PATENT DOCUMENTS

| | | | |
|---|---|---|---|
| 4,245,265 | 1/1981 | Kogure et al. | 360/66 |
| 4,484,237 | 11/1984 | Muto | 360/25 |
| 4,611,253 | 9/1986 | Kamei | 360/66 |
| 4,688,112 | 8/1987 | Shoji et al. | 360/60 |

(List continued on next page.)

FOREIGN PATENT DOCUMENTS

| | | | |
|---|---|---|---|
| 2079666 | 4/1993 | Canada | 360/77.04 |
| 0479703 | 4/1992 | European Pat. Off. . | |
| 60-129969 | 7/1985 | Japan . | |
| 61-087207 | 9/1986 | Japan . | |

(List continued on next page.)

OTHER PUBLICATIONS

IBM Technical Disclosure Bulletin, vol. 37, No. 5, May 1994, New York, pp. 397–401, Anonymous, 'Servo Gain Correction Method at Offset Position Using MR Head'.

Kaneko, Hisashi, Head Position Deviation Compensation System in Disk Drive, Patent Abstracts of Japan, vol. 16, No. 451, May 1992.

(List continued on next page.)

*Primary Examiner*—Andrew L. Sniezek
*Attorney, Agent, or Firm*—Greer, Burns & Crain Ltd.

[57] ABSTRACT

Disclosed are a method of and an apparatus for controlling a magnetic disc drive including a magnetic head in which a write head and a read head are separated. The control method comprises: a step of calculating a moving quantity up to a designated target track position in accordance with a write instruction or a read instruction and calculating a moving quantity from the moving quantity up to the target track position and a yaw angle offset quantity in accordance with the read instruction or the write instruction; and a step of locating the magnetic head in the target track position by seek-controlling the rotary type actuator in accordance with the calculated moving quantity. The control apparatus comprises: a first control circuit for indicating a seek to a designated target track in accordance with a write instruction or a read instruction; and a second control circuit for calculating a moving quantity up to a designated target track position in accordance with the write instruction or the read instruction, calculating a moving quantity from the moving quantity up to the target track position and a yaw angle offset quantity in accordance with the read instruction or the write instruction and thus seek-controlling the rotary type actuator in accordance with the calculated moving quantity.

12 Claims, 25 Drawing Sheets

U.S. PATENT DOCUMENTS

| | | |
|---|---|---|
| 4,700,243 | 10/1987 | Tsuyuguchi et al. ............ 360/69 |
| 4,737,867 | 4/1988 | Ishikawa et al. ............ 360/69 |
| 4,802,033 | 1/1989 | Chi ............ 360/77.04 |
| 4,821,125 | 4/1989 | Christensen et al. ............ 360/46 |
| 4,908,722 | 3/1990 | Sonobe ............ 360/46 |
| 4,969,059 | 11/1990 | Volz et al. ............ 360/78.04 |
| 5,073,833 | 12/1991 | Best et al. ............ 360/77.04 X |
| 5,208,711 | 5/1993 | Kitamura et al. ............ 360/77.05 |
| 5,253,131 | 10/1993 | Chevalier ............ 360/78.14 |
| 5,257,149 | 10/1993 | Meyer ............ 360/77.05 X |
| 5,345,347 | 9/1994 | Hopkins et al. ............ 360/71 |
| 5,353,170 | 10/1994 | Fung et al. ............ 360/77.04 X |
| 5,367,411 | 11/1994 | Nishiyama et al. ............ 360/66 |
| 5,373,403 | 12/1994 | Okamura et al. ............ 360/67 |
| 5,412,518 | 5/1995 | Christner et al. ............ 360/66 |
| 5,430,584 | 7/1995 | Petersen ............ 360/78.04 |
| 5,434,725 | 7/1995 | Hirose et al. ............ 360/77.04 |
| 5,457,587 | 10/1995 | Suzuki ............ 360/77.04 |
| 5,477,103 | 12/1995 | Romano et al. ............ 318/601 |
| 5,500,776 | 3/1996 | Smith ............ 360/77.04 |
| 5,751,512 | 5/1998 | Anderson ............ 360/78.04 |

FOREIGN PATENT DOCUMENTS

| | | |
|---|---|---|
| 61-208127 | 9/1986 | Japan . |
| 61-276110 | 12/1986 | Japan . |
| 62-140283 | 6/1987 | Japan . |
| 63-014369 | 1/1988 | Japan . |
| 63-071981 | 4/1988 | Japan . |
| 63171369 | 3/1990 | Japan . |
| 2257496 | 10/1990 | Japan . |
| 03063981 | 3/1991 | Japan . |
| 03186073 | 8/1991 | Japan . |
| 258055 | 2/1992 | Japan . |
| 5242617 | 9/1993 | Japan . |
| 05314686 | 11/1993 | Japan . |

OTHER PUBLICATIONS

IBM Technical Disclosure Bulletin, vol. 21, No. 8, Jan. 1979 New York US, pp. 3339–3340, XP002001665, Anonymous: Automatic Bias Control for MR Heads.

IBM Technical Disclosure Bulletin, vol. 33, No. 5, Oct. 1990, New York, US, pp. 391–393, XP002001666, Anonymous: "Adjustable Read Bias Current for Enhanced Head Reliability".

IBM Technical Disclosure Bulletin, vol. 36, No. 12, Dec. 1993, New York, US, pp. 271–272, XP002001667, Anonymous: "Electro Static Discharge Protection for Magneto Resistive Head/ Arm Assembly".

IBM Technical Disclosure Bulletin, vol. 34, No. 6, Nov. 1991, New York, US, pp. 426–427, XP002001668, Anonymous: "Optimal Method of Increasing Life of Magnetoresistive Head in Sector Servo".

FIG. 6

| CYLINDER ADDRESS | YAW ANGLE OFFSET |
|---|---|
| 0~127 | $y_{10}$ |
| 128~255 | $y_{11}$ |
| ... | ... |
| S-127~S | $y_{1l}$ |

300-1

| CYLINDER ADDRESS | YAW ANGLE OFFSET |
|---|---|
| 0~127 | $y_{n0}$ |
| 128~255 | $y_{n1}$ |
| ... | ... |
| S-127~S | $y_{nl}$ |

300-n

FIG. 23
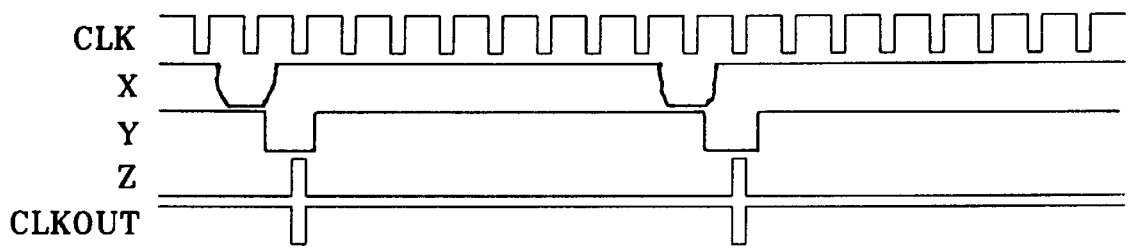
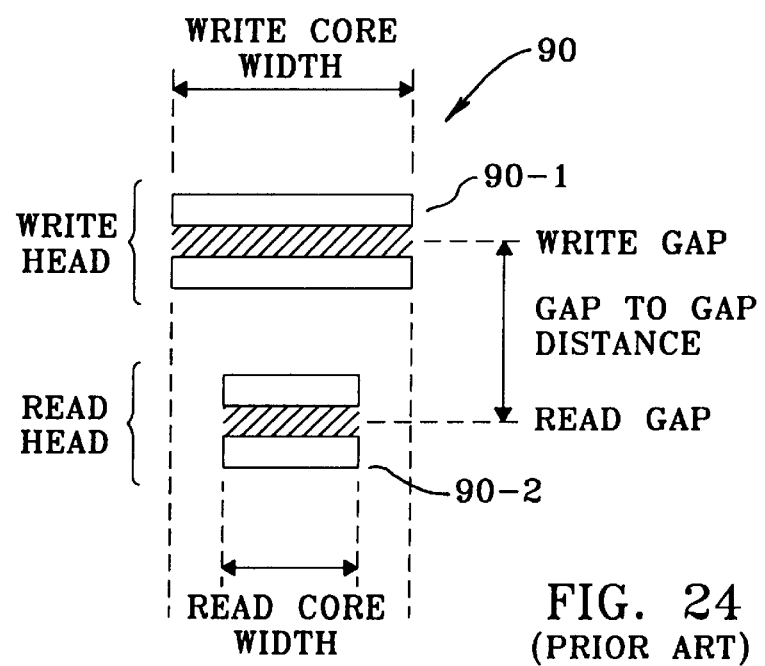
FIG. 24
(PRIOR ART)

(PRIOP ART)

METHOD OF AND APPARATUS FOR CONTROLLING MAGNETIC DISC DRIVE

This is a divisional of U.S. application Ser. No. 08/370,417 filed on Jan. 9, 1995, now abandoned.

BACKGROUND OF THE INVENTION

1. Field of the Invention

The present invention relates to a method of and an apparatus for controlling a magnetic disc drive for performing a record on a magnetic disc.

2. Description of the Related Art

Corresponding to a desire to both downsize and a larger capacity of a magnetic disc unit in recent years, a recording density on a magnetic disc has been enhanced, i.e., a track density and a bit density have been enhanced. Enhancing the bit density entails the use of a magnetoresistance head (MR head) capable of taking a greater level of a regenerative signal as a reading head in place of an inductive head capable of effecting conventional read/write processing. For this reason, there are prepared two pieces of magnetic heads, i.e., the inductive head for writing and the MR head for reading.

Track-directional positions of these two heads are different from each other, and, hence, a variety of contrivances are needed for the control method.

FIG. 24 is an explanatory diagram of the MR head FIG. 25 is an explanatory diagram of a yaw angle. FIG. 26 is an explanatory diagram of a data format of the magnetic disc.

As illustrated in FIG. 24, a magnetic head 90 has an MR head 90-2 used as a read head in order to enhance the bit density. When this MR head is employed as the read head 90-2, it is required that a write head 90-1 be separately provided. For example, an inductive head is employed for the write processing. A variety of problems to be obviated arise when using such an MR head.

First, the heads 90-1, 90-2 of the magnetic head 90 have different gap positions. On the other hand, a rotary type actuator is employed for moving the magnetic head 90 in radial directions of the magnetic disc. This rotary type actuator rotates about the center of rotation, and its locus depicts a circular arc. Accordingly, an angle (known as a yaw angle) to a track (cylinder) direction of the magnetic head is not 0°.

Besides, as shown in FIG. 25, the yaw angle changes on the inner and outer sides of the magnetic disc. For this reason, especially a track positional deviation of the MR head 90-2 is induced. Therefore, a mixing degree of signal components of adjacent tracks fluctuates depending on the respective tracks. This leads to a decline in terms of resolution of the read data.

For preventing this decline, there was proposed a method of reducing a gap width of the MR head 90-2 so that the gap of the MR head 90-2 does not extend over to the adjacent track on any track. Based on this method, however, there arises such a problem that a read output level decreases, and, correspondingly, an S/N ratio also increases. For this reason, a core width of the read head 90-2 is narrowed only to some extent. Even though done in such a way, when an offset is caused due to a thermal off-track or the like, a positional margin on one side is sufficient, but the positional margin on the opposite side is reduced.

As a method of increasing this positional margin, there is proposed a yaw angle correcting method of changing offset quantities both in a read position and in a write position (see Japanese Patent Laid-Open Publication No.4-232610).

As illustrated in FIG. 26, generally in a data format of the magnetic disc, an ID part is provided in front of a data part. Accordingly, when executing a write instruction, the ID part is read, and the writing to the data part is carried out. Hence, according to the prior art, the ID part is read, and, therefore, a seek with a correction of the yaw angle is effected. Made thereafter is a seek movement corresponding to a correction quantity of the yaw angle, thus effecting the writing process to the data part.

Second, the MR head 90-2 is defined as a magnetoresistance element. This MR head 90-2 reads the data by flowing a bias current. That is, the data is read by making use of variations in resistance value according to a magnetic force of the magnetoresistance element. This MR head 90-2 has a portion where a resistance variation with respect to the magnetic force does not exhibit a linear characteristic. For this reason, an operating point is set at a portion where the resistance variation with respect to the magnetic force takes the linear form by regulating the bias current. This regulation has hitherto been done manually.

Third, the MR head 90-2, as explained above, reads the data by running the bias current. Therefore, a voltage is applied to the MR head 90-2. Hitherto, the voltage has been applied to the MR head 90-2 simultaneously when switching ON a power supply.

Fourth, when enhancing the bit density, servo data on a servo surface of the magnetic disc are recorded with a high density by use of the MR head. Consequently, even a trace of defect of the servo data is precisely read.

There exist, however, the following problems inherent in the prior art.

According to the conventional yaw angle correcting method of changing the offset quantities in the read and write positions, the seek with the correction of the yaw angle is executed when performing the writing process, and the ID part is read. Thereafter, the writing to the data part is carried out after being moved corresponding to the correction quantity of the yaw angle, and hence this takes a time, correspondingly. Therefore, as illustrated in FIG. 26, it is required that a gap (GAP)-2 between the ID part and the data part be elongated, resulting in a reduction in capacity of the data part on the magnetic disc.

Further, in the conventional manual regulation of the bias current, the bias current is manually regulated while seeing a regenerative waveform through an oscilloscope or the like. It is therefore difficult to set an optimal bias current. This conduces to a decrease in read margin.

Moreover, the voltage has hitherto been applied to the MR head 90-2 simultaneously with the power-ON, and, hence, the voltage was applied before the magnetic disc was rotating sufficiently. For this reason, it follows that the voltage is applied in the course of floating of the MR head 90-2. This brings about the possibility in which the MR head 90-2 is damaged due to discharging with respect to the magnetic disc having no electric potential. In addition, because the voltage is applied when not required, and consequently a decline of the characteristic due to variations with a passage of time is caused in the MR head 90-2.

Similarly, when the defect occurs in the servo data, the servo control is not well conducted, resulting in a destruction of the data or a stoppage of the control system.

SUMMARY OF THE INVENTION

It is a primary object of the present invention to provide a method of and an apparatus for controlling a magnetic disc drive for making preferable a reading process by a read head separated from a write head.

It is another object of the present invention to provide a method of and an apparatus for controlling a magnetic disc drive for improving a data format efficiency even by correcting a yaw angle of a read head separated from a write head.

It is still another object of the present invention to provide a method of and an apparatus for controlling a magnetic disc drive for optimizing a bias current of a read head separated from a write head.

It is a further object of the present invention to provide a method of and an apparatus for controlling a magnetic disc drive for protecting a read head separated from a write head.

It is still a further object of the prevent invention to provide a method of and apparatus for controlling a magnetic disc drive for detecting a servo error by a read head separated from a write head at an early stage.

To accomplish the above objects, according to one aspect of the present invention, there is provided a method of controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the method comprising; a step of calculating a moving quantity up to a designated target track position in accordance with a write instruction or a read instruction and calculating a moving quantity from the moving quantity up to the target track position and a yaw angle offset quantity in accordance with the read instruction or the write instruction; and a step of locating said magnetic head in the target track position by seek-controlling said rotary type actuator in accordance with the calculated moving quantity.

Further, according to another aspect of the present invention, there is provided an apparatus for controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the apparatus comprising: a first control circuit for indicating a seek to a designated target track in accordance with a write instruction or a read instruction; and a second control circuit for calculating a moving quantity up to a designated target track position in accordance with the write instruction or the read instruction, calculating a moving quantity from the moving quantity up to the target track position and a yaw angle offset quantity in accordance with the read instruction or the write instruction and thus seek-controlling the rotary type actuator in accordance with the calculated moving quantity.

According to this aspect of the present invention, when a write instruction is given, in the case of a seek set so that the write head comes to the center of a write track, the yaw angle correction is performed so that the read head comes to the center of the write track only when a read instruction is given. Reversely when the read instruction is issued, in the case of a seek set so that the read head comes to the center of the write track, the yaw angle correction is performed so that the write head comes to the center of the write track when the write instruction is issued.

If done in this way, the yaw angle correction is not performed in the reading of an ID part when in the writing process. The ID part is, however, small in length and, besides, has a fixed length unlike a data part. The ID part is also smaller in terms of an updating frequency than in the data part, and hence there is a less probability of causing a read error. For this reason, in the writing process, there is a small necessity for performing the correction of the yaw angle in the reading of the ID part. Further, if the read error happens in reading the ID part, this error can be relieved by a retry after waiting one rotation. This exhibits a much higher efficiency than by elongating a gap part between the ID part and the data part in consideration of a throughput of the system.

According to still another aspect of the present invention, there is provided a method of controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the method comprising: a step of measuring an optimal bias current value of the read head from an output of the read head by changing a bias current of the read head; a step of storing the measured optimal bias current value in a memory; a step of reading the optimal bias current value from the memory when selecting the read head; and a step of supplying the bias current having the thus read bias current value to the read head.

According to a further aspect of the present invention, there is provided an apparatus for controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the apparatus comprising: a memory; and a control circuit for measuring an optimal bias current value of the read head, storing in the memory the measured optimal bias current value, reading the optimal bias current value from the memory when selecting the read head and supplying the bias current value to the read head.

According to this aspect of the present invention, the control circuit measures the optimal bias current value of the read head, and stores this value in the memory. Then, the control circuit, when selecting a read head, reads the optimal bias current value from the memory and supplies the read head with this bias current. With this processing, an auto adjustment of the bias current can be realized. For this reason, the proper bias current value can be set, and, besides, a labor for the adjustment can be omitted.

According to a still further aspect of the present invention, there is provided a method of controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the method comprising: a step of rotating a spindle motor for rotating the magnetic disc from the time of when switching ON of a power supply; a step of detecting whether or not the spindle motor reaches steady rotations; and a step of starting a supply of the electric power to a drive circuit of the magnetic head, corresponding to the fact that the spindle motor reaches the steady rotations.

According to a yet further aspect of the present invention, there is provided an apparatus for controlling a magnetic disc drive including: a magnetic disc; a magnetic head including a write head for writing data to the magnetic disc and a read head for reading the data from the magnetic disc;

and a rotary type actuator for locating the magnetic head in a desired track position on the magnetic disc, the apparatus comprising: a steady rotation detection circuit for detecting whether or not a spindle motor for rotating the magnetic disc reaches steady rotations from the time of switching ON of the power supply; and a power supply control circuit for starting a supply of the electric power to a drive circuit of the magnetic head, corresponding to the fact that the spindle motor reaches the steady rotations.

According to this aspect of the present invention, the supply of the electric power to the drive circuit of the magnetic head is started by detecting that the spindle motor has reached the steady rotations. Hence, the electric power is not supplied in a state where a floating posture of the magnetic head is unstable when the spindle motor has not yet reached the steady rotations. It is therefore possible to prevent discharging between the MR head and the magnetic disc and consequently a destruction of the MR head.

According to an additional aspect of the present invention, there is provided a method of controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the method comprising: a step of rotating a spindle motor for rotating the magnetic disc from the time of switching On of a power supply; a step of detecting whether or not the spindle motor reaches steady rotations; and a step of starting a supply of a bias current to the read head, corresponding to the fact that the spindle motor has reached the steady rotations.

According to another additional aspect of the present invention, there is provided an apparatus for controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the apparatus comprising: a steady rotation detection circuit for detecting whether or not a spindle motor for rotating the magnetic disc reaches steady rotations from the time of switching ON of the power supply; and a bias current control circuit for starting a supply of a bias current to the read head, corresponding to the fact that the spindle motor has reached the steady rotations.

According to this aspect of the present invention, there is started the supply of the bias current to the read head, corresponding to the fact that the spindle motor reached the steady rotations. Hence, no electric power is supplied in the state where the floating posture of the magnetic head is unstable when the spindle motor has not yet reached the steady rotations. It is therefore possible to prevent the discharging between the MR head and the magnetic head and consequently the destruction of the MR head.

According to still another additional aspect of the present invention, there is provided a method of controlling a magnetic disc drive including:. a magnetic disc; a magnetic head including a write head for writing data to the magnetic disc and a read head for reading the data from the magnetic disc; and a rotary type actuator for locating the magnetic head in a desired track position on the magnetic disc, the method comprising: a step of detecting that the write head is on a data writing process; and a step of stopping the supply of the electric current to the read head, corresponding to a detection that the write head is on the data writing process.

According to a further additional aspect of the present invention, there is provided an apparatus for controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the apparatus comprising: a control circuit for detecting that the write head is on a data writing process; and a bias current control circuit for stopping a supply of the electric current to the read head, corresponding to detection that the write head is on the data writing process.

According to this aspect of the present invention, the supply of the electric current to the read head is stopped corresponding to the fact that the write head is on the data writing process, and hence the supply of the unnecessary electric current can be reduced. It is therefore feasible to prevent a deterioration of the read head.

According to a still further additional aspect of the present invention, there is provided a method of controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the method comprising: a step of detecting that there is no access to the magnetic disc drive between a predetermined time interval; and a step of stopping the supply of the electric current to the read head, corresponding to a detection that there is no access between the predetermined time interval.

According to a yet further additional aspect of the present invention, there is provided an apparatus for controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the apparatus comprising: a control circuit for detecting that there is no access to the drive between a predetermined time interval; and a bias current control circuit for stopping a supply of the electric current to the read head, corresponding to detection that there is no access between the predetermined time interval.

According to this aspect of the present invention, the supply of the electric current to the read head is stopped corresponding to the fact that there is no access between the predetermined time interval, and hence the supply of the unnecessary electric current can be reduced. It is therefore feasible to prevent the deterioration of the read head.

According to one other aspect of the present invention, there is provided a method of controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the method comprising: a step of reading markers written at fixed intervals on a servo surface of the magnetic disc by use of the magnetic head; a step of monitoring an interval at which the thus read markers appear; and a step of generating a servo error signal when the marker appearing interval is not fixed.

According to still one other aspect of the present invention, there is provided an apparatus for controlling a magnetic disc drive including: a magnetic disc; a magnetic head including a write head for writing data to the magnetic disc and a read head for reading the data from the magnetic disc; and a rotary type actuator for locating the magnetic head in a desired track position on the magnetic disc, the apparatus comprising: a monitoring circuit for monitoring an appearing interval of markers written at a fixed interval on a servo surface of the magnetic disc on the basis of a read output of the magnetic head; and a control circuit for generating a servo error signal, corresponding to the fact that the marker appearing interval is not fixed.

According to this aspect of the present invention, there is monitored the appearing interval of the markers written at the fixed interval on the servo surface of the magnetic disc that are read by the magnetic head. Then, if the marker appearing interval is not fixed, the servo error signal is generated, and, therefore, the servo error can be detected at the early stage. For this reason, even if the servo error occurs, a proper action can be taken at the early stage.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 6 is a diagram showing a structure of a yaw angle offset table in the configuration of FIG. 3;

FIG. 23 is a timer chart of the circuit of FIG. 22;

FIG. 24 is an explanatory diagram of the MR head;

DETAILED DESCRIPTION OF THE PREFERRED EMBODIMENTS

Figure 1A:
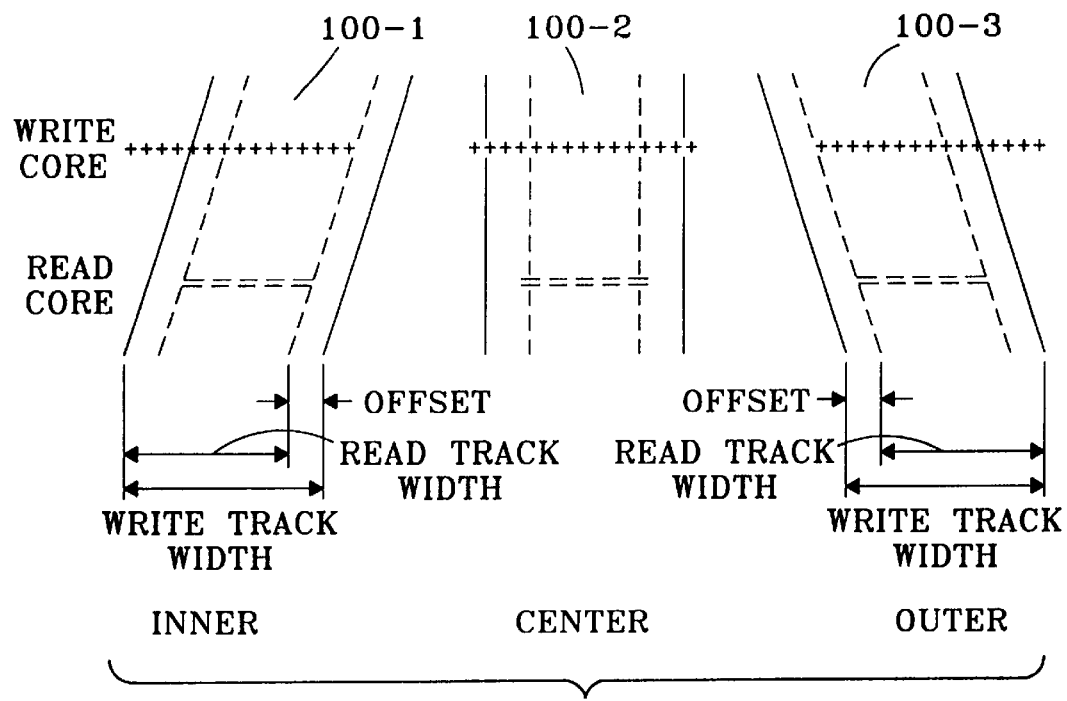
FIGS. 1A and 1B are diagrams of the principle of the present invention.
Figure 1B:
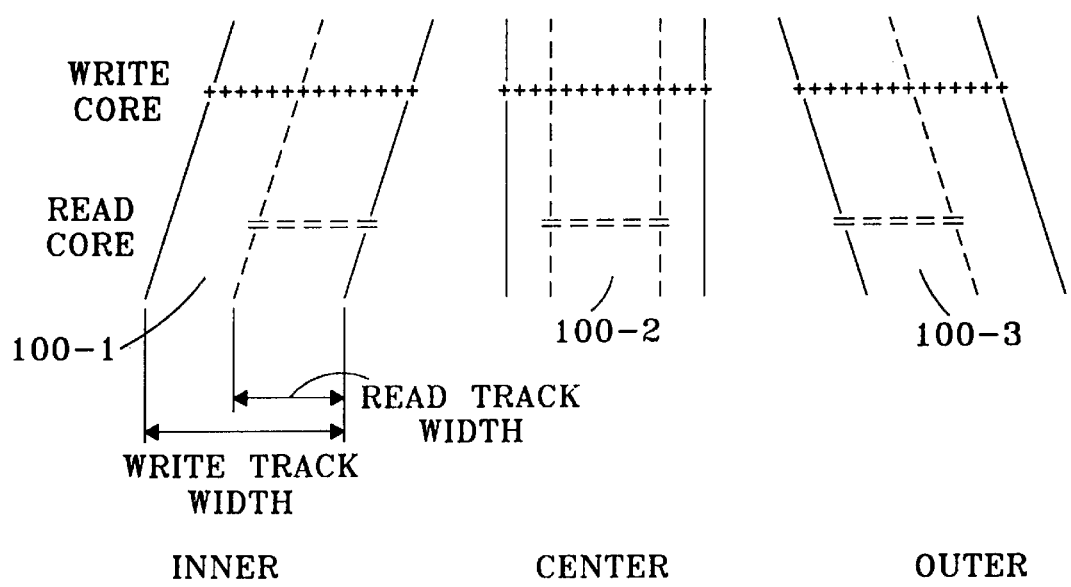

FIGS. 1A and 1B are diagrams illustrating the principle of the present invention.

As illustrated in FIG. 1B, when executing a write instruction, a seek operation is set so that a write head comes to the center 100-2 of a write track. Then, as shown in FIG. 1A, a yaw angle correction is performed so that the read head moves to the center 100-2 of the write track only when executing the read instruction. More specifically, when executing the write instruction, a moving quantity of the seek is calculated based on only a moving quantity to a target track. On the other hand, when executing a read instruction, there is calculated a seek moving quantity obtained by adding a yaw angle offset quantity to the moving quantity to the target track.

Reversely, if the seek is set so that the read head comes to the center 100-2 of the write track when executing the read instruction, the yaw angle correction is performed so that the write head comes to the center 100-2 of the write track when executing the write instruction.

With this arrangement, the yaw angle correction is, when written, not performed in the reading from the ID part. The ID part is, however, small in length and, besides, has a fixed length unlike the data part. The ID part is also smaller in terms of an updating frequency than in the data part, and hence there is a less probability of causing a read error. For this reason, there is a small necessity for performing the correction of the yaw angle in the reading from the ID part. Further, if the read error happens in the reading from the ID part, this error can be relieved by a retry after waiting one rotation. This exhibits a much higher efficiency than by elongating the gap part between the ID part and the data part in consideration of a throughput of the system.

Figure 2:
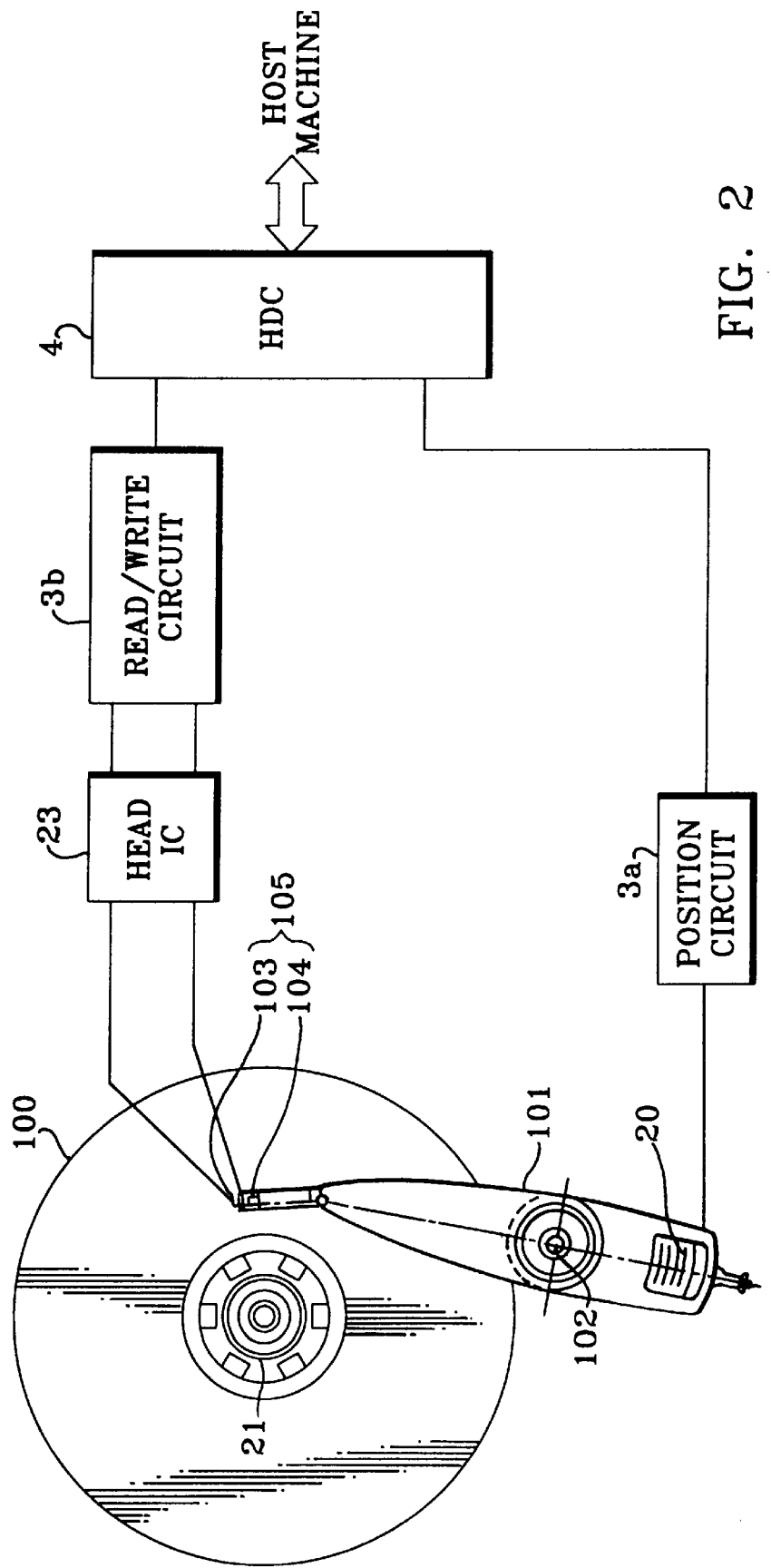
FIG. 2 is an entire block diagram illustrating one embodiment of the present invention.
Figure 3:
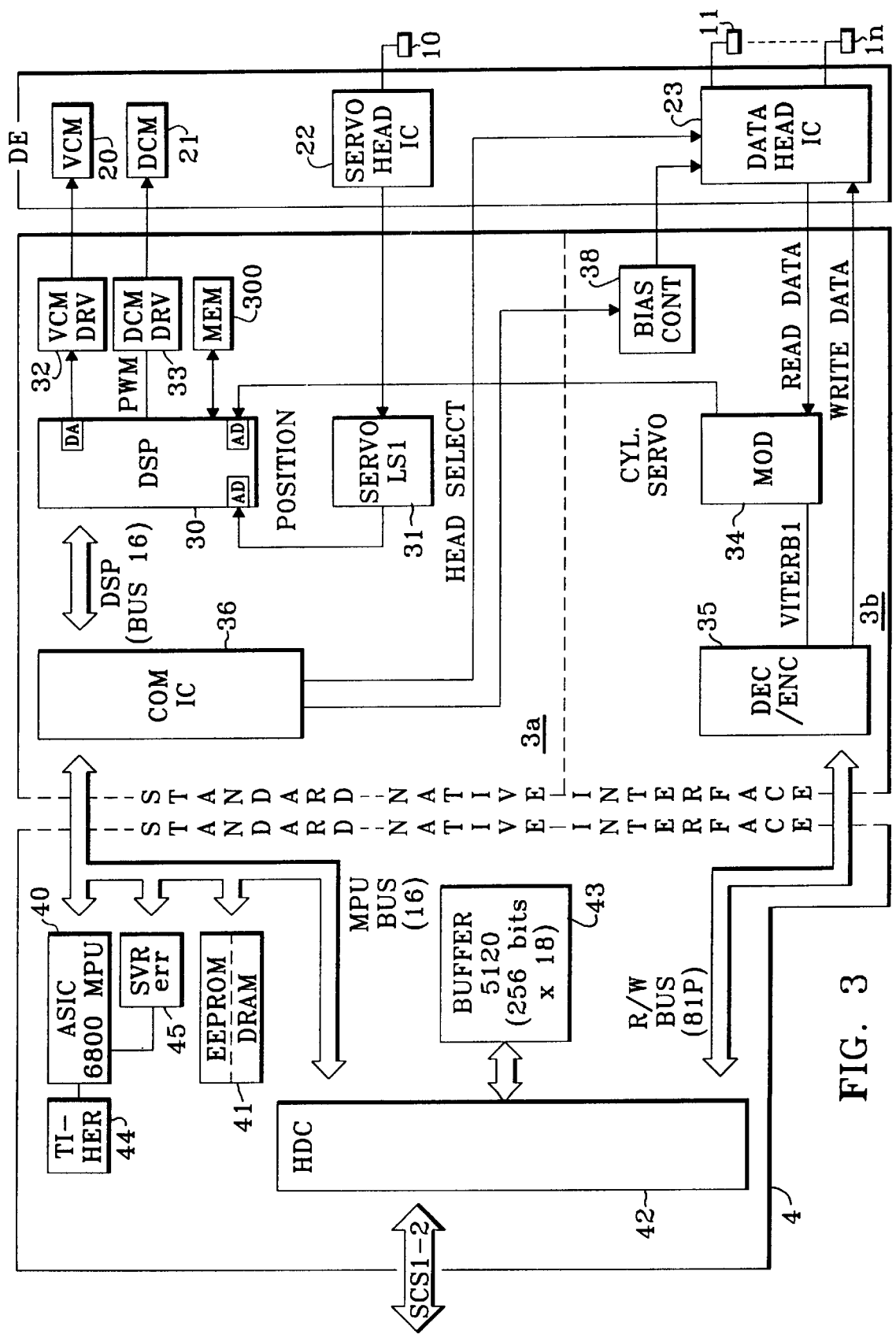
FIG. 3 is a block diagram fully illustrating a configuration of FIG. 2.
Figure 4:
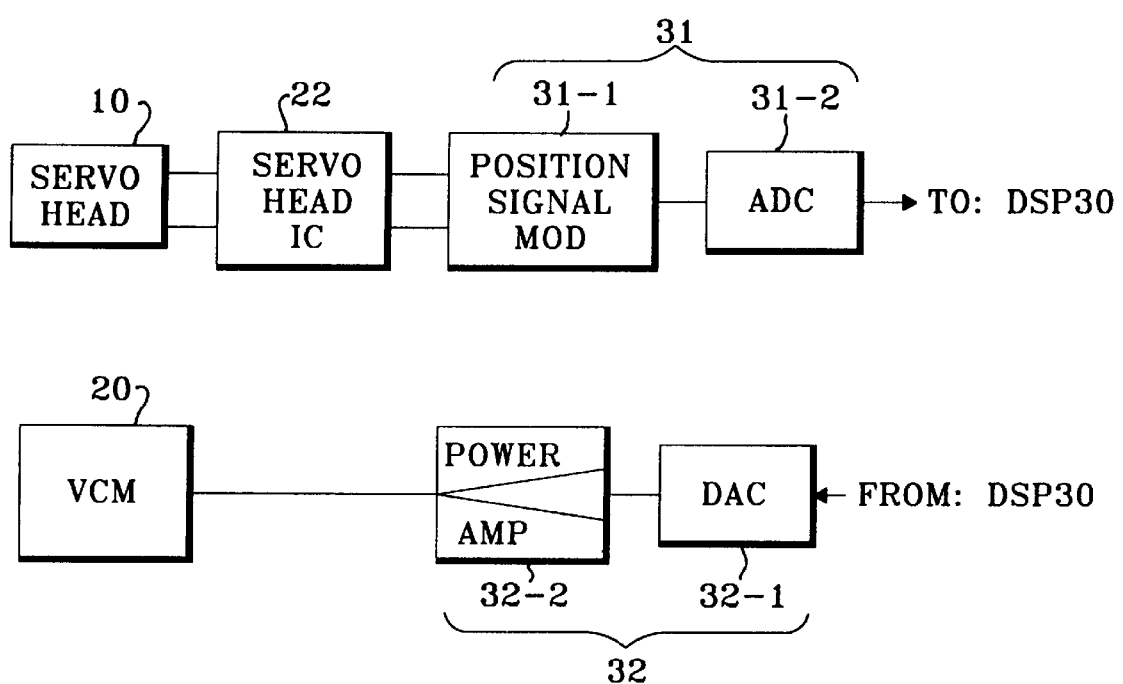
FIG. 4 is a block diagram illustrating a servo demodulation circuit and a VCM drive circuit of FIG. 3.
Figure 5:
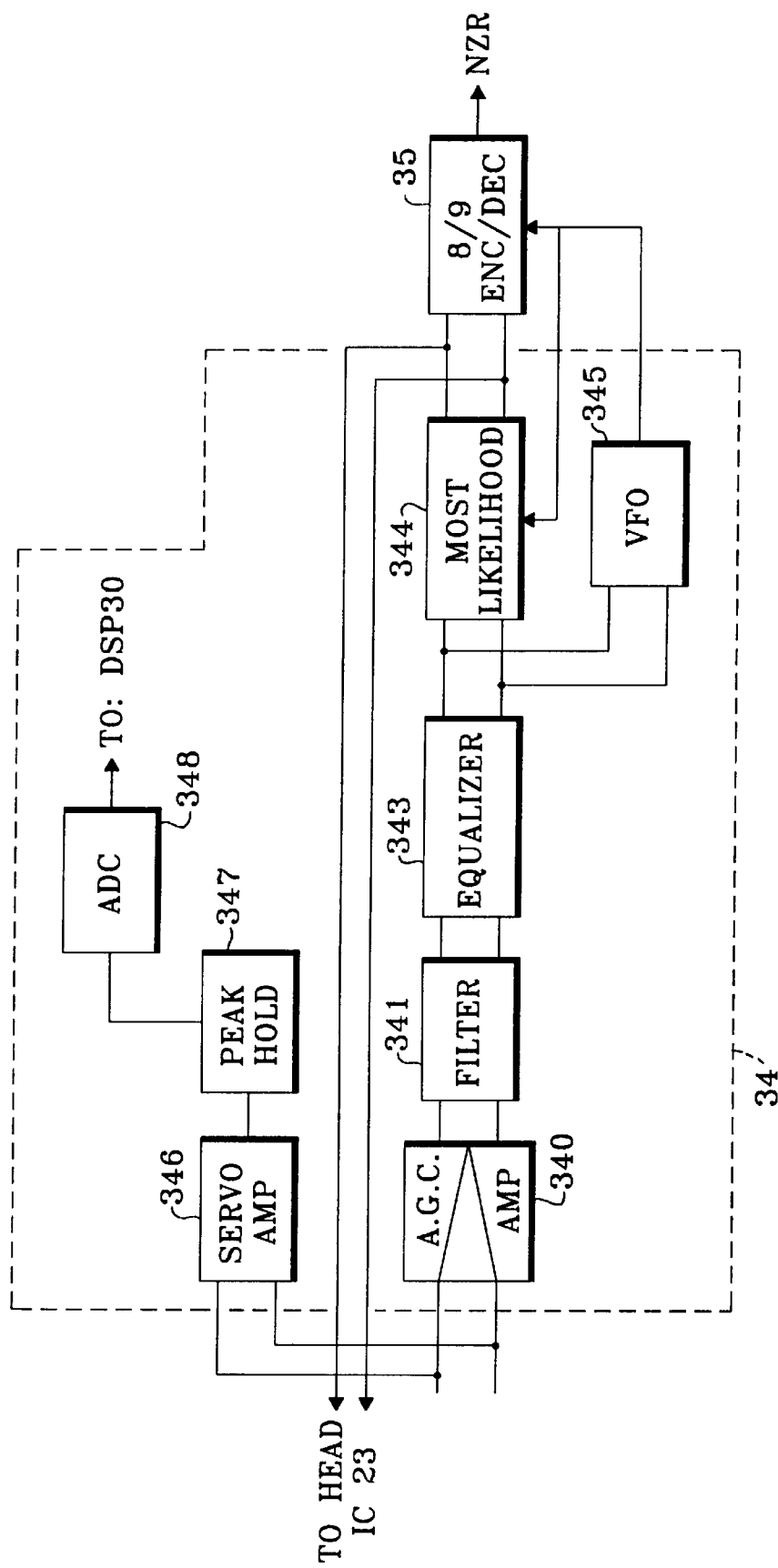
FIG. 5 is a block diagram illustrating a data demodulation encoding/decoding circuit of FIG. 3.

FIG. 2 is a view illustrating the whole configuration in one embodiment of the present invention. FIG. 3 is a detailed block diagram of FIG. 2. FIG. 4 is a block diagram illustrating a servo demodulation circuit and a VCM drive circuit of FIG. 3. FIG. 5 is a block diagram showing a data demodulating-encoding/decoding circuit of FIG. 3.

As illustrated in FIG. 2, a magnetic disc drive 1 includes a magnetic disc 100 rotated by a spindle motor 21 and an actuator 101 rotating about a rotary shaft 102. The magnetic disc drive 1 also includes a VCM coil 20 provided at a rear portion of the actuator 101 and a magnetic head 105 provided at the tip of the actuator 101. This magnetic head 105 has a write head 103 composed of an inductive element and a read head 104 composed of an MR element.

This magnetic head 105 is connected to a head IC 23 for supplying a write current and a read bias current. The head IC 23 is connected to a read/write circuit 3*b* for demodulating the read data. The coil 20 of the actuator 101 is connected to a position circuit 3a for effecting servo control. A hard disc controller 4 controls the above read/write circuit 3b and the position circuit 3a in order to read or write the data to a desired track of the magnetic disc 100.

Turning to FIG. 3, a servo head 10 reads servo data from a servo surface of the magnetic disc 100. This servo head 10 is also composed of the MR head. Data read heads 11–1n are constructed of the MR heads and read the data from a data surface of the magnetic disc 100 as well as reading the servo data. The VCM coil 20 serves to constitute a part of a VCM (voice coil motor) for moving the actuator 101. The spindle motor 21 rotates the magnetic disc 100.

A servo head IC 22 works to drive the servo head 10. The data head IC 23 selects an unillustrated write head and the read heads 11–1n in accordance with select signals and drive them. A digital-signal processor 30 calculates a moving quantity in accordance with a seek indication and servo-controls the VCM coil 20 as well as controlling the spindle motor 21 at a constant velocity. A memory 300 stores necessary items of data for controlling the digital-signal processor 30.

A servo demodulation circuit 31 demodulates a servo signal read through the servo head 10 and outputs this signal to the digital-signal processor 30. A VCM driver circuit 32 drives the VCM coil 20 on the basis of a command quantity of the digital-signal processor 30. A DCM driver circuit 33 drives the spindle motor 21 on the basis of a command quantity of the digital-signal processor 30.

A communication IC 36 serves to intervene between the digital-signal processor 30 and an interface-oriented processor 40 which will be stated later. These elements constitute the position circuit 3a.

A demodulation circuit 34 demodulates the read data given from the data head IC and outputs the read data in the form of Viterbi codes. The demodulation circuit 34, at the same time, outputs cylinder servo signals to the digital-signal processor 30. An encoding/decoding circuit 35 decodes the Viterbi codes given from the demodulation circuit 34 and outputs the decoded result to a hard disk control circuit 42. The encoding/decoding circuit 35, at the same time, encodes the write data into the Viterbi codes and outputs the Viterbi codes to the data head IC 23.

A bias current control circuit 38, in accordance with an indication from the communication IC 36, controls the bias current running across the MR heads 11–1n through the data head IC 23. A read/write circuit 3b is constructed of the demodulation circuit 34, the encoding/decoding circuit 35 and the bias current control circuit 38.

The interface control processor 40 (hereinafter simply termed a processor) performs a variety of interface control operations. A memory 41 stores various items of data needed for the processing by the processor 40. The hard disc control circuit 42 including an interface of an SCSI (Small Computer Interface) -2 analyzes the signals received and controls a transmission and a receipt of the data.

A buffer 43 serves to store the data necessary for the processing of the hard disc control circuit 42. A timer 44 measures a time required for the processing by the processor 40. The timer 44 will hereinafter be explained with reference to FIG. 20 which follows. A servo error detection circuit 45 monitors a marker interval and detects a servo error. The servo error detection circuit 45 will be stated later with reference to FIGS. 18 to 19B.

These elements constitute a hard disc controller 4.

As illustrated in FIG. 4, the servo demodulation circuit 31 has a servo demodulation circuit 31-1 for demodulating the servo signal of the servo head 10 through the servo head IC 22. The servo demodulation circuit 31 also has an AD converter 31-2 for A/D-converting the demodulation signal and outputting it to the digital-signal processor 30.

Further, the VCM drive circuit 32 includes a DA converter 32-1 for D/A-converting the drive signal given from the digital-signal processor 30 and also a power amplifier 32-2 for driving the VCM coil 20 by an output of the DA converter 32-1.

As illustrated in the block diagram of the data demodulating-encoding/decoding circuit, an AGC amplifier 340 AGC-controls the read signals of the read heads 11–1n. A filter circuit 341 cuts off a high-frequency component of the output of the AGC amplifier 340. An equalizer circuit 343 auto-equalizes an output of the filter circuit 341. A most likelihood detection circuit 344 detects the Viterbi code. A VFO circuit 345 generates a synchronous clock signal from an output of the equalizer circuit 343.

A data surface servo amplifier 346, for a calculation of an off-track correction quantity, amplifies the servo signals recorded on the data surface of the magnetic disc that are read by the read heads 11–1n. A peak hold circuit 347 detects a peak of the output of the servo amplifier 346. An AD (Analog/Digital) converter 348 converts a peak hold output of the peak hold circuit 347 into a digital value and inputs this digital value to the digital-signal processor 30. These elements constitute the demodulation circuit 34.

An 8/9 encoding/decoding circuit 35 encodes 8-bit write data into 9-bit data and outputs the 9-bit data to the write head. The 8/9 encoding/decoding circuit 35, at the same time, converts the 9-bit read data into 8-bit NRZ data and outputs the NRZ data as an item of read data.

FIG. 6 is a diagram showing a structure of a yaw angle offset table based on the configuration of FIG. 3. The memory 300 of the digital-signal processor 30 stores a set of yaw angle offset tables 300-1 to 300-n. The yaw angle offset tables 300-1 to 300-n are provided corresponding to the respective read heads (MR heads) 11–1n. Each of these yaw angle offset tables 300-1 to 300-n is a correspondence table of a cylinder address versus a yaw angle offset quantity.

This yaw angle offset quantity is set at intervals of 128 cylinders. For instance, the yaw angle offset quantity is "y10" up to 0–127 cylinders of the read head 11. This kind of setting is based on an auto measurement by calibrations. That is, the seek is performed by changing the yaw angle offset quantity, and such a yaw angle offset quantity that the read margin is maximized is automatically measured, thus storing the yaw angle offset tables 300-1 to 300-n with the measured results.

Figure 7:
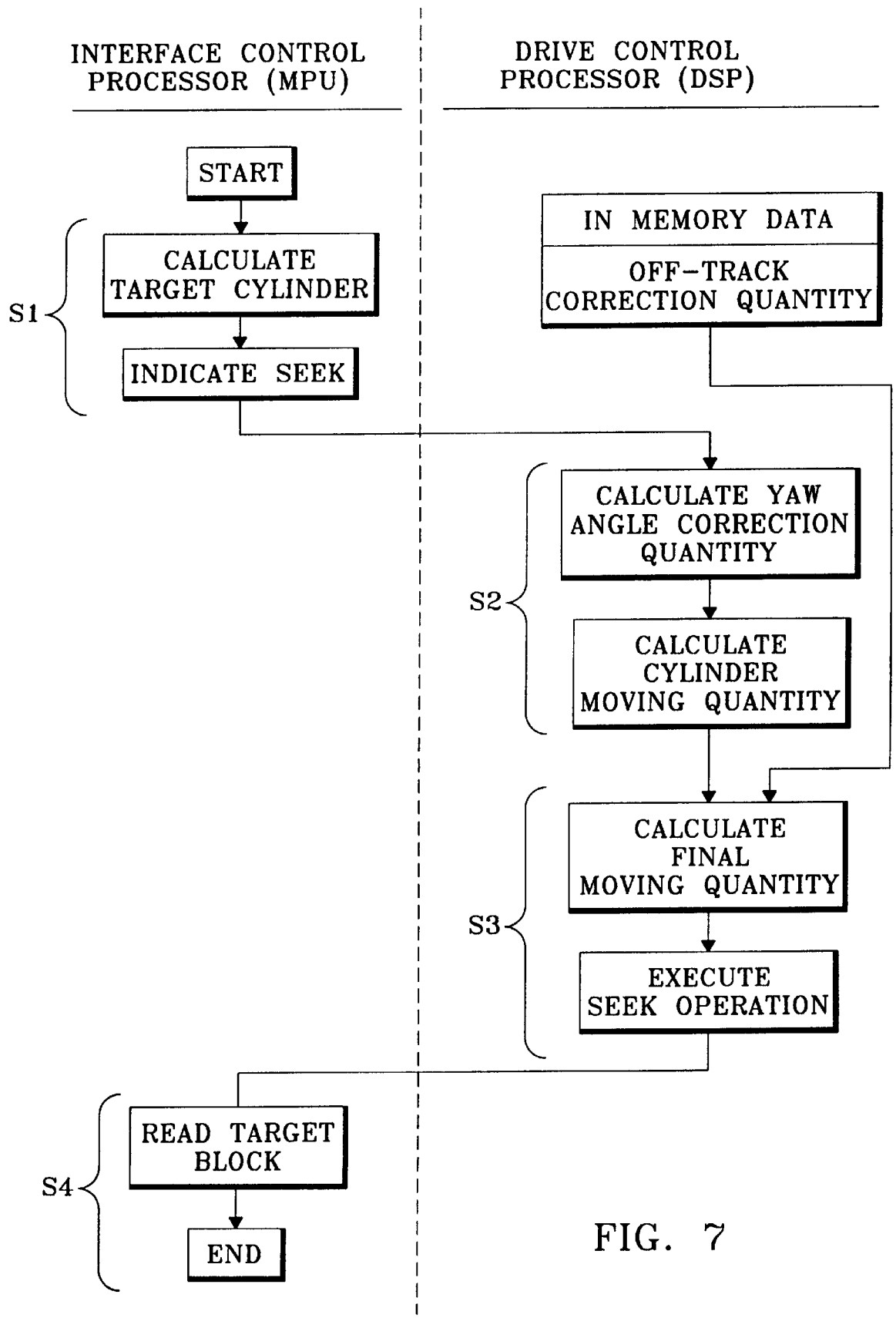
FIG. 7 is a flowchart of read seek processing in one embodiment of the present invention.
Figure 8:
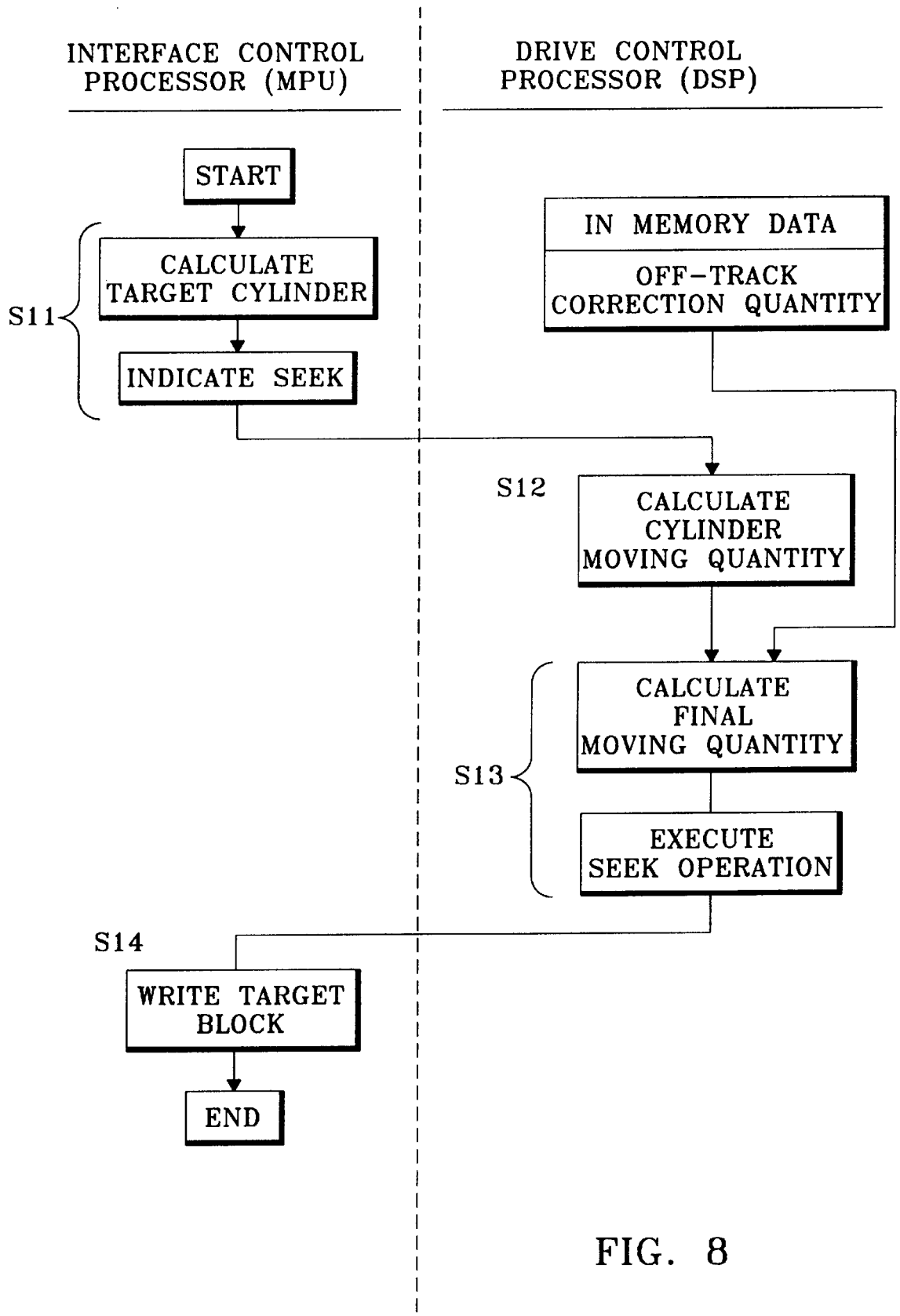
FIG. 8 is a flowchart of write seek processing in one embodiment of the present invention.
Figure 9A:
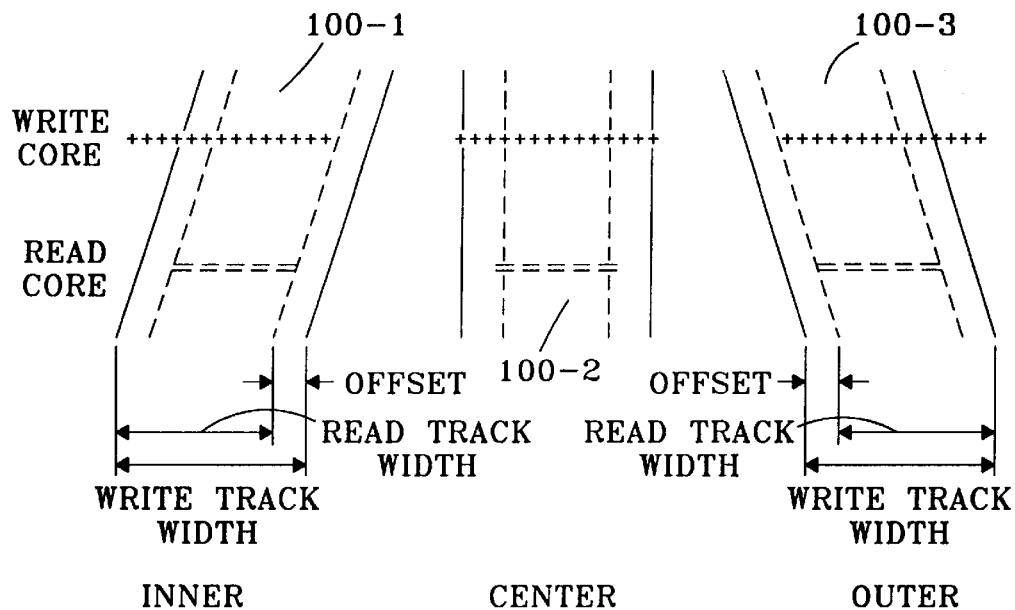
FIGS. 9A and 9B are diagrams of assistance in explaining the operations of FIGS. 7 and 8.
Figure 9B:
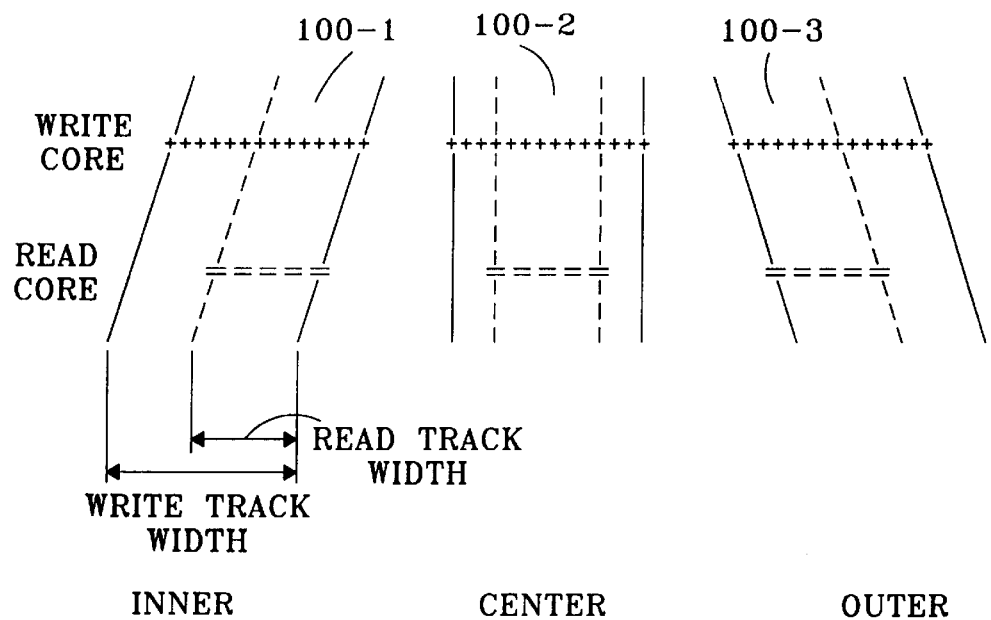

FIG. 7 is a read seek processing flowchart. FIG. 8 is a write seek processing flowchart. FIGS. 9A and 9B are diagrams of assistance in explaining the operations thereof.

The read seek operation will be discussed with reference to FIG. 7.

(S1) As shown in FIG. 7, the processor 40, when receiving a read seek command from the hard disc control circuit 42, calculates a target cylinder from a target read block (S1-1). Then, the processor 40 indicates a read seek (S1-2) to the target cylinder to the digital-signal processor 30.

(S2) The digital-signal processor 30, with reference to the yaw angle offset tables 300-1 to 300-n, obtains a yaw angle offset quantity (yaw angle correction quantity) corresponding to the target cylinder and the selected head as well from the target cylinder and the head selection signal (S2-1).

Then, the digital-signal processor 30 calculates a cylinder moving quantity from the target cylinder and a current cylinder (S2-1).

(S3) On the other hand, the memory 300 of the digital-signal processor 30 stores off-track quantities of the respective tracks positions. Accordingly, the digital-signal processor 30 reads an off-track correction quantity of the cylinder position on the magnetic disc surface that corresponds to the selected head. Then, the digital-signal processor 30 calculates a final moving quantity by adding the cylinder moving quantity, the yaw angle offset quantity and the off-track correction quantity (S3-1).

Subsequently, the digital-signal processor 30 drives the VCM coil 20 through the VCM driver circuit 32 in accordance with the above final moving quantity. With this processing, the actuator 101 seeks toward the target track (S3-2).

(S4) Upon a completion of the seeking with the above final moving quantity, the digital-signal processor 30 notifies the processor 40 of the completion of the seek. Upon this notification, the processor 40 outputs a head selection signal to the data head IC 23 and flows the bias current across the corresponding head. Simultaneously, the hard disc control circuit 42 is notified of this current flow. The hard disc control circuit 42 takes out a target read block from the read data given from the head via the demodulation circuit 34 and the encoding/decoding circuit 35 as well and sends this block to the SCSI interface.

Next, a write seek operation will be discussed with reference to FIG. 8.

(S11) As shown in FIG. 8, the processor 40, when receiving a write seek instruction from the hard disc control circuit 42, calculates a target cylinder from a target write block (S11-1). Then, the processor 40 indicates the write seek to the target cylinder to the digital/signal processor 30 (S11-2).

(S12) The digital-signal processor 30 calculates a cylinder moving quantity from the target cylinder and the current cylinder.

(S13) The digital-signal processor 30 reads an off-track quantity of the cylinder position on the magnetic disc surface that corresponds to the selected head. Next, the digital-signal processor 30 calculates a final moving quantity by adding the cylinder moving quantity and the off-track correction quantity (S13-1).

Subsequently, the digital-signal processor 30 drives the VCM coil 20 through the VCM driver circuit 32 in accordance with the above final moving quantity. With this processing, the actuator 101 seeks toward the target track (S13-2).

(S14) Upon a completion of the seeking with the above-mentioned moving quantity, the digital-signal processor 30 notifies the processor 40 of the completion of the seek. Upon this notification, the processor 40 outputs a head selection signal to the data head IC 23 and applies a driving voltage to the corresponding write head. Simultaneously, the hard disc control circuit 42 is notified of this voltage application. The hard disc control circuit 42 supplies the write head with the write data via the encoding/decoding circuit 35. The write head is thereby driven, and the write data is written to the target write block.

As illustrated in FIG. 9A, the seek moving quantity in the read seek is determined by the cylinder moving quantity, the off-track correction quantity and the yaw angle offset quantity. That is, since the yaw angle correction is conducted, the read head core is located at the center 100-2 of the write track on the inner 100-1, center 100-2 and outer sides 100-3 of the magnetic disk 100, and a read margin is widened.

On the other hand, as shown in FIG. 9B, the seek moving quantity in the write seek is determined by the cylinder moving quantity and the off-track correction quantity. That is, since the yaw angle correction is not effected, the write head core is located at the center 100-2 of the write track on the inner 100-1, center 100-2 and outer 100-3 sides of the magnetic disk 100, and a write margin is widened.

When in this writing process, it is required that the ID part be read prior to the writing process particularly in the format write and in the data write as well. At this time, as shown in FIG. 9B, the read head core is not located at the center 100-2, and, hence, there exists a possibility in which a read error will occur. The ID part to be read, however, has a short length and, besides, a fixed length unlike the data part. The ID part is smaller in terms of an updating frequency than in the data part, and hence there is a less probability of causing the read error For this reason, when in the write processing, there is a small necessity for correcting the yaw angle in the read processing from the ID part. Further, if the read error is produced in the read processing from the ID part, this error can be relieved with a retry after waiting one rotation. This exhibits a much higher data storage efficiency than by elongating a gap part 2 between the ID part and the data part in the prior art in consideration of a throughput of the system.

In this example, the yaw angle correction is performed when in the read processing. Reversely, however, the yaw angle correction is performed when in the write processing, thereby locating the write head at the center of the write track. The yaw angle correction is not performed when in the read processing, and the read head may be located at the center of the write track.

Figure 10:
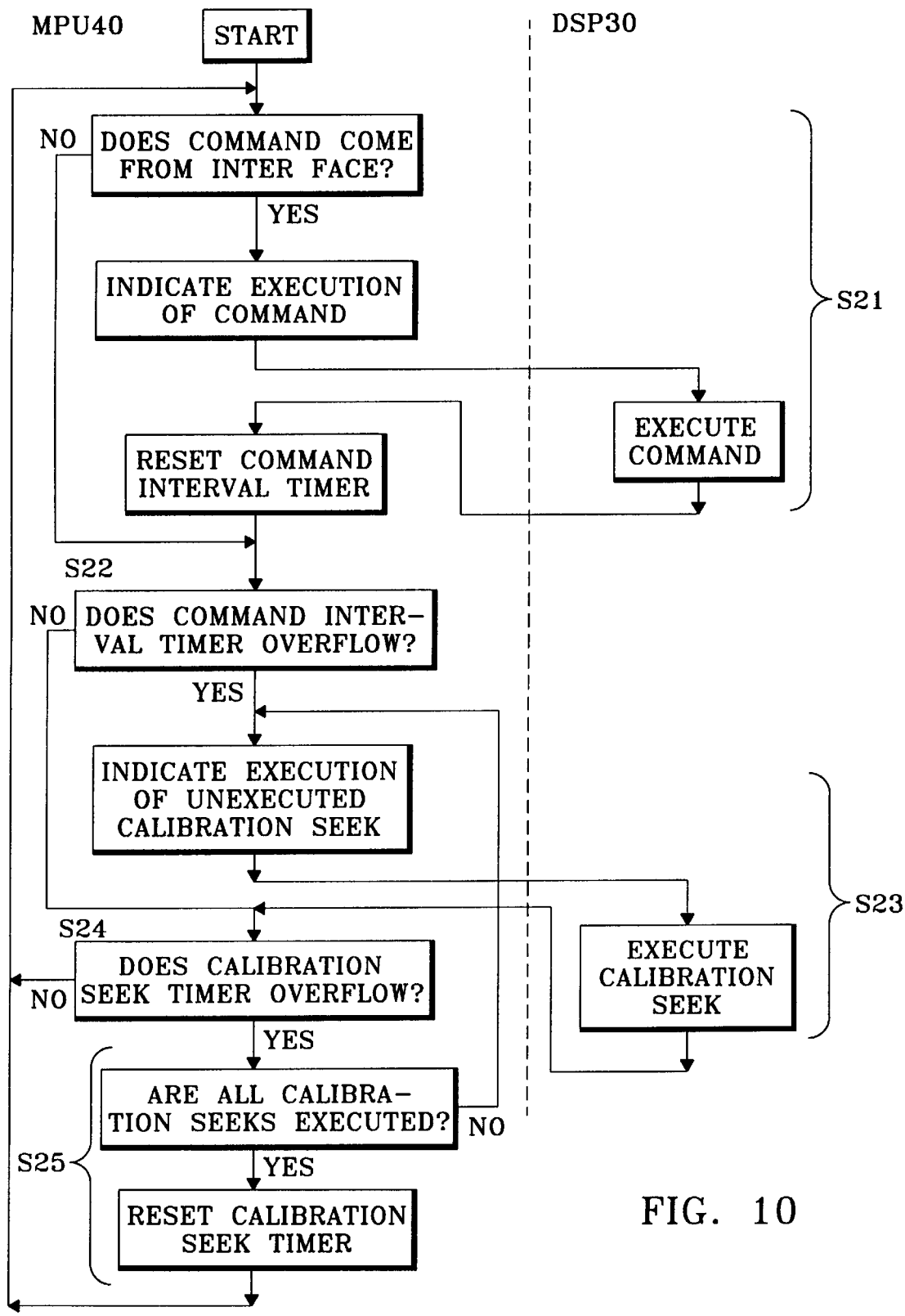
FIG. 10 is a flowchart of calibration processing in one embodiment of the present invention.

Next, the calibrating operation will be described with reference to FIG. 10.

The calibrating operation is classified into an operation of detecting the off-track quantity per head and an operation of detecting the VCM magnetic force per cylinder. In accordance with this embodiment, the calibration seek is performed not at one time but intermittently. With this operation, a drop in total throughput of the interface is restrained down to the minimum, and the calibration seek is thus executed.

(S21) The processor 40 determines whether or not a command is given from the hard disc control circuit 42 (S21-1). The processor, when determining that the command (read/write command) comes in, indicates the digital-signal processor 30 to execute the command (S21-2). The digital-signal processor 30 executes the command (S21-2). For example, if determined as the read/write command, as shown in FIGS. 7 and 8, the command is executed.

Then, after finishing the execution of the command, there is reset a command interval timer, for measuring an interval of the commands, of the processor 40, thus starting the operation (S21-4).

(S22) The processor 40, when determining that command does not come in or when executing the command in step S21, determines whether or not the command interval timer overflows.

(S23) The overflow of the command interval timer implies that the command does not come in between a predetermined time interval. Accordingly, when the command interval timer overflows, the digital-signal processor 30 receives an indication to execute unexecuted calibration seeks among segmented calibration seeks a1–aN (S23-1). According to this indication, the digital-signal processor 30 executes the segmented calibration seeks (S23-2).

(S24) In step S22, if the command interval timer does not overflow, or when executing the segmented calibration seeks, the processor 40 checks whether a calibration seek timer for determining an interval for executing the calibration seek overflows or not. If the calibration seek timer does not overflow, the interval of executing the calibration seek is not yet reached, and, therefore, the processing returns to step S21.

(S25) Whereas if the calibration seek timer overflows, the interval of executing the calibration seek is reached, and hence the processor 40 checks whether or not all the segmented calibration seeks are executed from a management table of its own (S25-1). If the processor 40 determines that all the segmented calibration seeks are not yet executed, the processing goes back to step S23. The processor 40, reversely when determining that all the segmented calibration seeks have already been executed, resets the calibration timer to start the operation, and the processing returns to step S21 (S25-2).

In this way, there is not yet reached the interval of executing the calibration seek, and, meanwhile, the calibration seek is segmented and thus executed if the command does not come in during the fixed period. Then, when the calibration seek execution interval is reached, the remaining calibration seeks are executed. Hence, the total throughput of the interface is increased, and the calibration seeks are executable at the fixed intervals.

Figure 11A:
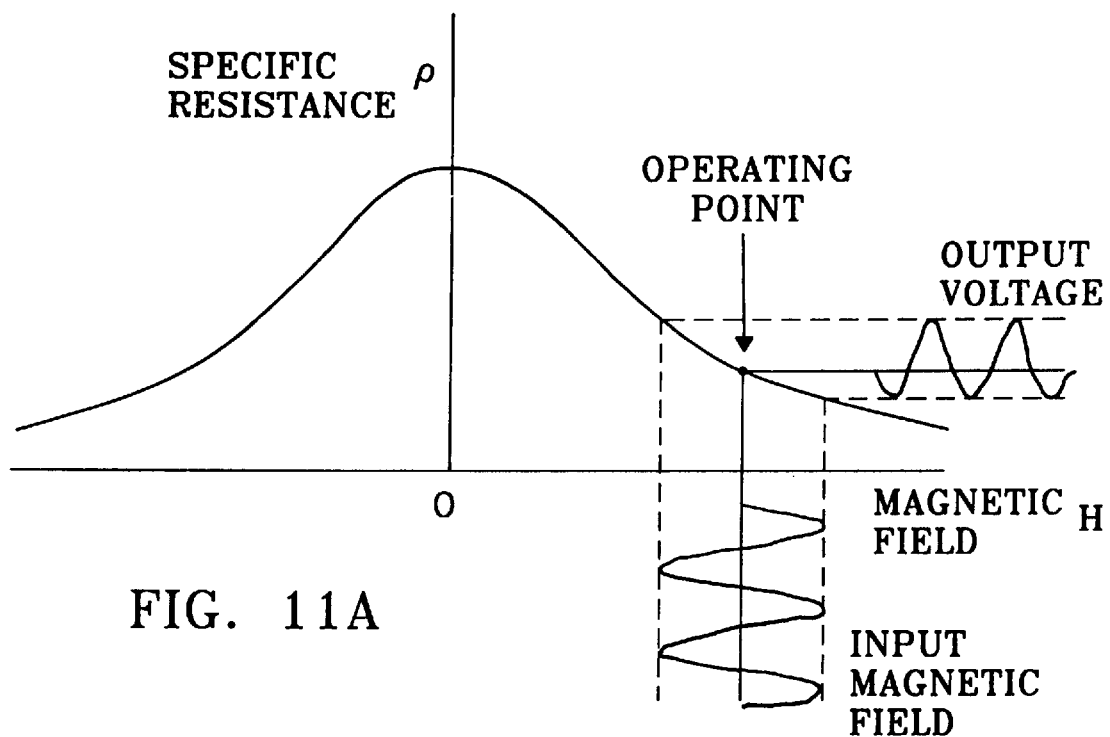
FIGS. 11A and 11B are diagrams of assistance in explaining a bias current of an MR head.
Figure 11B:
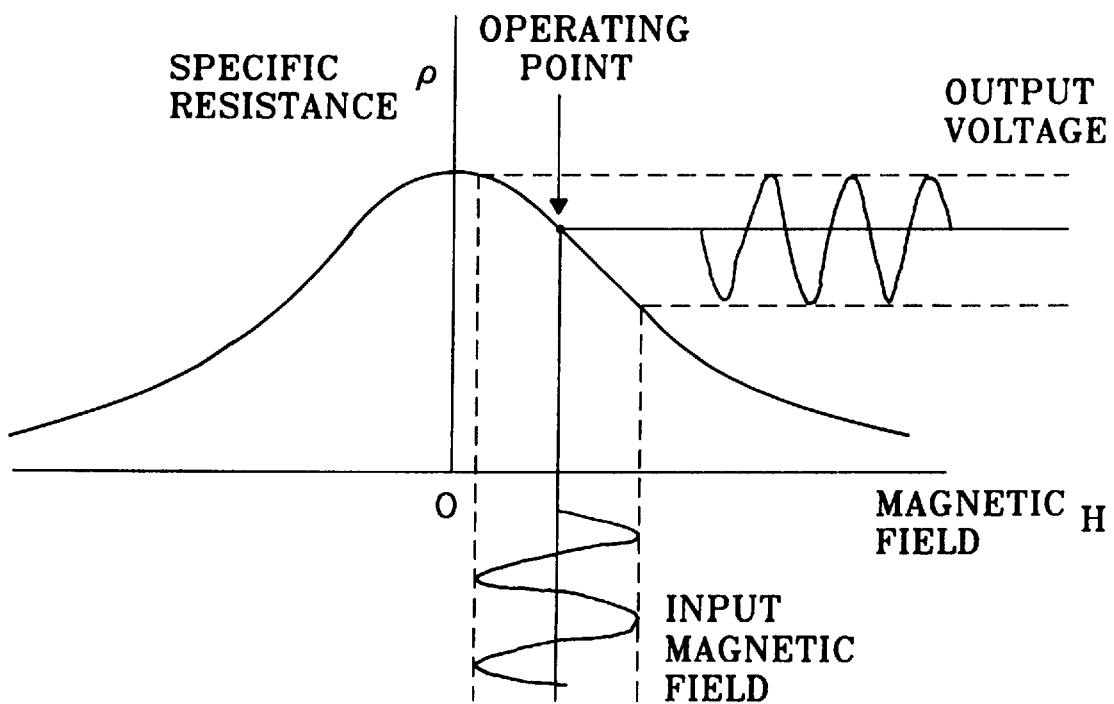
Figure 12:
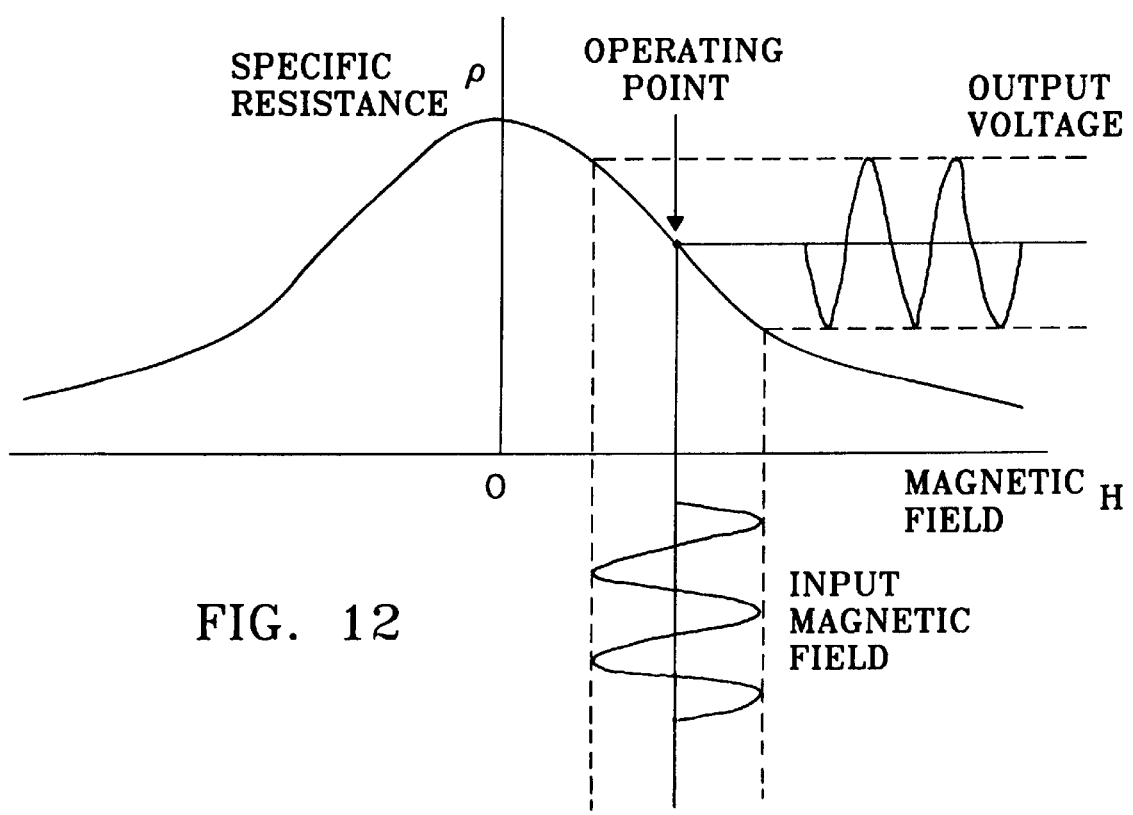
FIG. 12 is a diagram of assistance in explaining an optimal bias current of the MR head.
Figure 13:
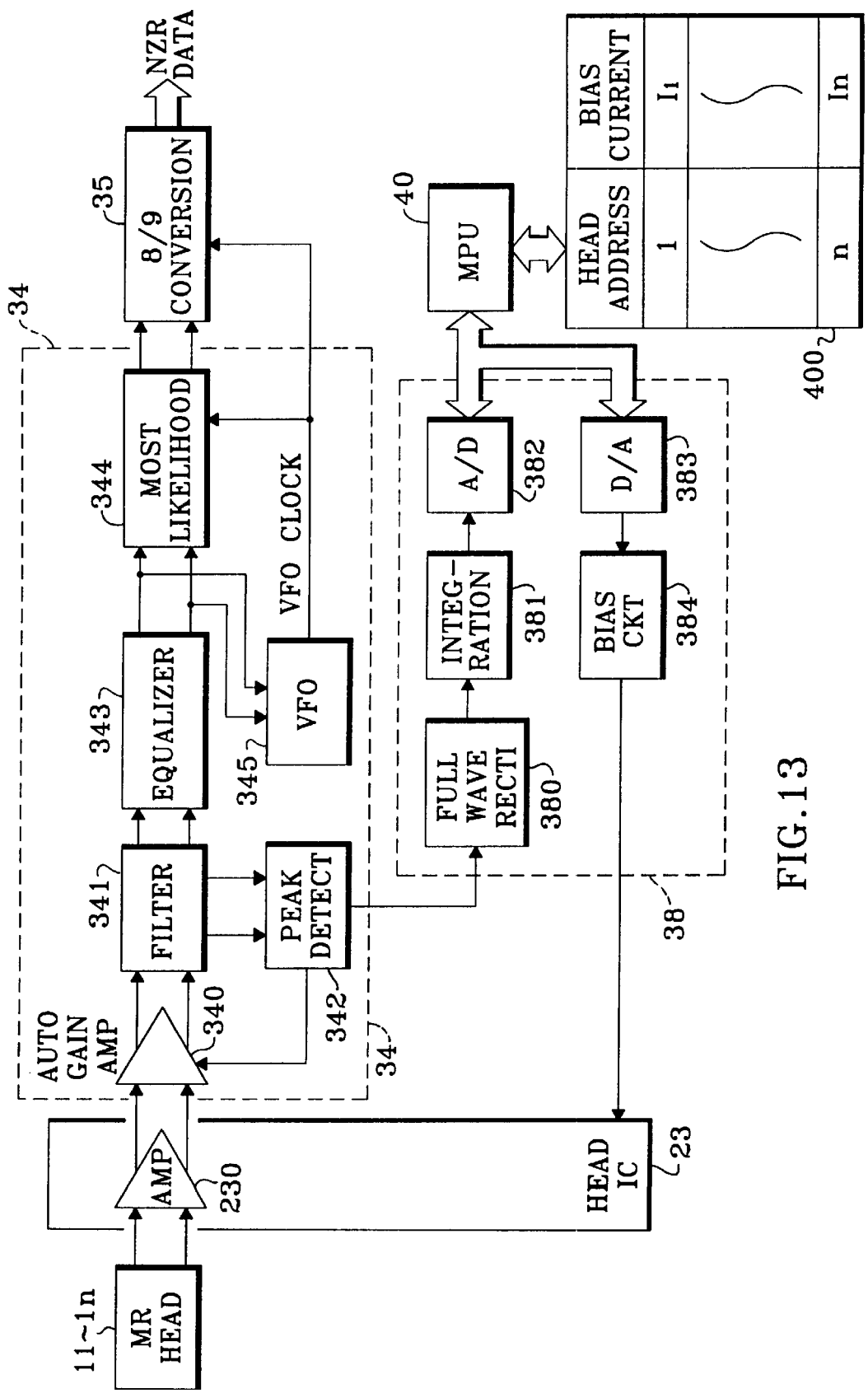
FIG. 13 is a block diagram showing an auto adjustment of the optimal bias current of the MR head.
Figure 14:
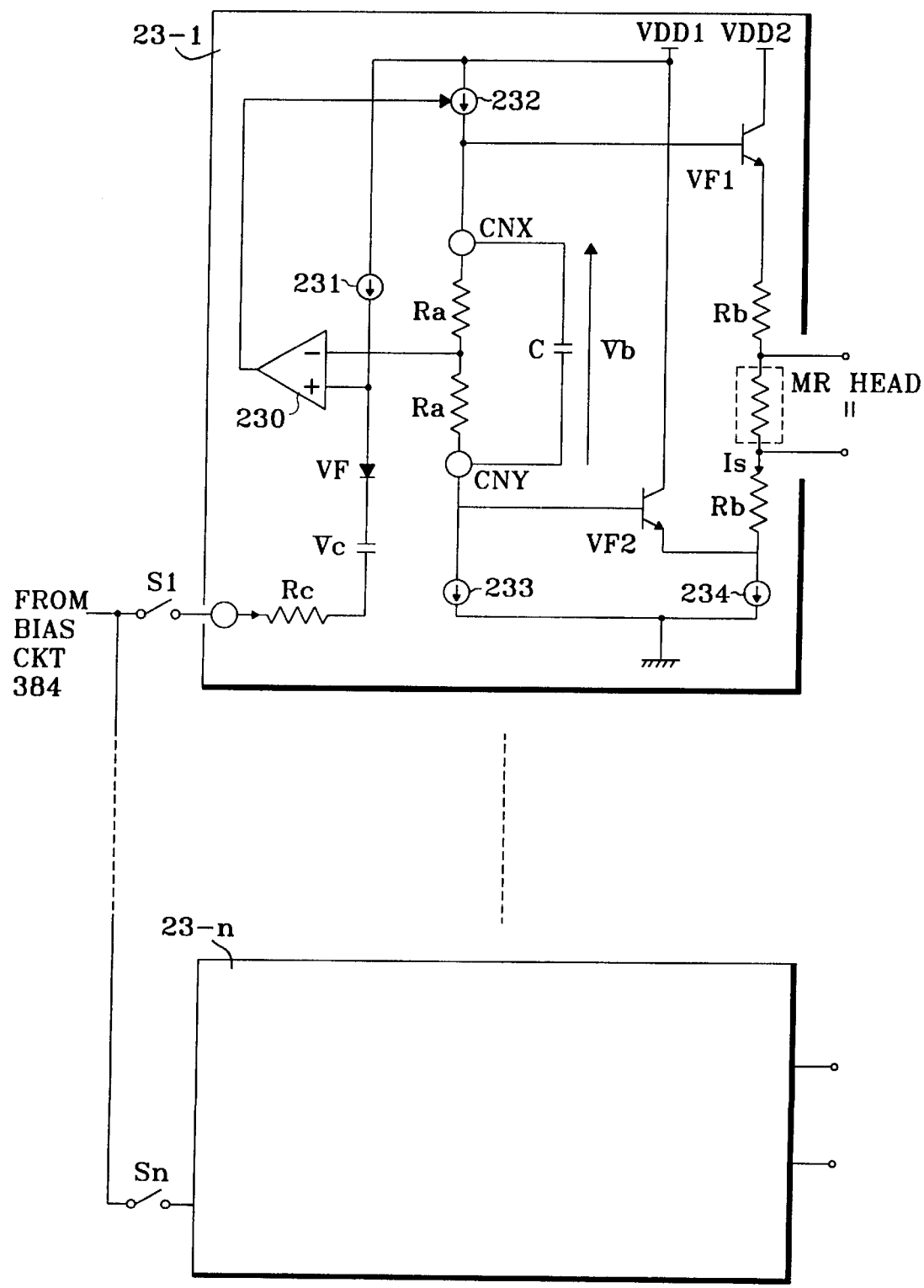
FIG. 14 is a circuit diagram of a head IC of FIG. 13.

FIGS. 11A and 11B are diagrams of assistance in explaining the bias current of the MR head. FIG. 12 is a diagram of assistance in explaining an optimal bias current of the MR head. FIG. 13 is a block diagram showing an auto adjustment of the bias current. FIG. 14 is a circuit diagram of the head IC of FIG. 13.

A specific resistance of the MR head against the magnetic field changes as shown in FIGS, 11A and 11B. Accordingly, if the operating point (bias current) is not adequately selected, an output voltage for an input magnetic field does not coincide. In an example shown in FIG. 11A, as the operating point is low, the output voltage is asymmetric between the upper and lower halves. In an example shown in FIG. 11B, since the operating point is high, the output voltage is asymmetric between the upper and lower halves.

In an example of FIG. 12, the operating point is adequate, and hence the output voltage is symmetric between the upper and lower halves. This operating point is determined by the bias current given to the MR head. A conventional method of determining the bias current involves changing the bias current supplied to the MR head, observing an output of the regenerative waveform per head, determining such a bias value that pulse amplitude values of positive and negative poles show the symmetry and manually setting this bias value.

This method, however, depends on a visual observation of a man, and the problems are an intricacy of the measurement, an error, etc.. Also, the above method requires a good number of time-oriented steps. Moreover, if the bias current value is once fixed per head, it is impossible to follow up variations due to fluctuations in temperature. For this reason, the error becomes large, and this may be a factor of decreasing the reliability on the data demodulation.

In accordance with this embodiment, an auto adjustment mechanism is added to the apparatus itself, thereby reducing the number of time-oriented steps in terms of manufacturing the apparatus. Further, during the use of the apparatus, the auto adjustment mechanism is operated at intervals of a given time, thus following up the fluctuations in temperature and the variations with a passage of time. The reliability on the data demodulation function of the apparatus is thereby remarkably improved.

Referring to FIG. 13, the same elements as those shown in FIGS. 3–5 are marked with the like symbols. As illustrated in FIG. 13, the demodulation circuit 34 is provided with a peak detection circuit 342 for detecting an output peak of a filter circuit 341.

The bias current control circuit 38 includes a full-wave rectifier circuit 380 for full-wave-rectifying the output of the peak detection circuit 342 and an integrating circuit 381 for integrating a full-wave rectification output. The bias current control circuit 38 also includes an AD converter 382 for converting an output of the analog integration into a digital value and inputting the digital value to the processor 40. The bias current control circuit 38 further includes a DA converter 383 for converting the bias current value from the processor 40 into an analog quantity and a bias circuit (bias amplifier) 384 for amplifying and outputting an output of the DA converter 383 to the head IC 23.

Furthermore, the processor 40 incorporates a memory 400 for storing bias current values I1–In measured with respect to head addresses 1–n.

FIG. 14 is a circuit diagram of the head IC. In this circuit diagram, head drive circuits 23-1 to 23-n are provided corresponding to the respective MR heads 11–1n. These head drive circuits 23-1 to 23-n are connected to the above-mentioned bias circuit 384 via switches S1–Sn operated in response to head select signals.

Each of the head drive circuits 23-1 to 23-n has the same configuration. Herein, the circuitry will be explained by exemplifying the head drive circuit 23-1. The head drive circuit 23-1 has a reference voltage line consisting of a series circuit extending from a power supply voltage VDD1 via a current source 231, a diode VF and a voltage source Vc to a resistor Rc. The head drive circuit 23-1 also has a reference current line consisting of a series circuit extending from the power supply voltage VDD1 via a current source 232, a pair of resistors Ra, Ra and a current source 233 to the earth. A capacitor C for holding the voltage is provided in parallel to this pair of resistors Ra, Ra.

Then, a comparative amplifier 230 takes a difference between the reference voltage of the reference voltage line and a comparative voltage Vb of the resistor Ra of the reference current line. The current source 232 of the reference current line is controlled, thus holding the current of the reference current line to a reference value.

Formed, on the other hand, is a series circuit extending from a power supply VDD2 via a resistor Rb, an MR head 11, a resistor Rb and a current source 234 to the earth. A base of this first transistor VF1 is connected between the current source 232 and the resistor Ra of the reference current line. Provided further is a second transistor VF2 having a collector connected to the power supply voltage VDD1, a base connected between the resistor Ra and the current source 233 and an emitter connected between the resistor Rb and the current source 234.

In this circuit, a constant current value of the current source 232 is controlled in accordance with the bias current supplied via the switch S1 from the bias circuit 384. Under this control, a current is flowing across the MR head 11 is also proportional to the relevant bias current value.

Given next is an explanation of the operation of automatically adjusting the bias current running across the MR head.

Starting the auto adjusting operation, the processor 40 selects each head and outputs an initial value of the bias current value to the DA converter 383. The bias current value is then outputted via the bias circuit 384 to the head IC 23, whereby the corresponding bias current flows across that MR head.

Next, the bias current control circuit 38 receives the read signal from the MR head via the AGC amplifier 340, the filter circuit 341 and the peak detection circuit 342. The full-wave rectifier circuit 380 in the bias current control circuit 38 full-wave-rectifies the peak-detected read signal, and this result is integrated by the integrating circuit 381. An output of this integration is read to the processor 40 through the AD converter 382. If this integration output is constant, a read waveform of the MR head is symmetric between the upper and lower halves. Hence, the processor 40, whereas if the integration output is not constant, changes the above bias current value and measures the integration output of the read waveform.

In this manner, the processor 40 measures such an optimal bias current value that the integration output is constant or approximate to the constant value, and the thus measured optimal bias current value is stored in a relevant head address filed. Then, the processor 40 measures optimal bias current values with respect to all the MR heads, and the memory stores these measured values.

Thus, the bias current is automatically adjusted in the adjusting process when delivered from the factory. Then, when in an ordinary use, the corresponding optimal bias current value is read from the head address of the memory 400 that is selected by the processor 40. Subsequently, the processor 40 outputs this bias current value to the DA converter 383 and further outputs it to the head IC 23 via the bias circuit 384, thereby flowing the corresponding bias current across that MR head. With this processing, the output of each MR head shows the symmetry between the upper and lower halves, and the read error can be thereby prevented.

Further, the optimal bias current value changes due to the variations in temperature and the changes with the passage of time. Hence, the processor 40, during the use of the apparatus, executes the auto adjustment with a fixed period when the command does not come in and updates the optimal bias current value of the memory 400. If this is done in the calibration seek explained before with reference to FIG. 9, a higher efficiency is provided.

Thus, the optimal bias current is automatically adjusted, and, therefore, the measurement becomes easier with no error. Besides, it is possible to reduce the number of time-oriented steps.

Figure 15:
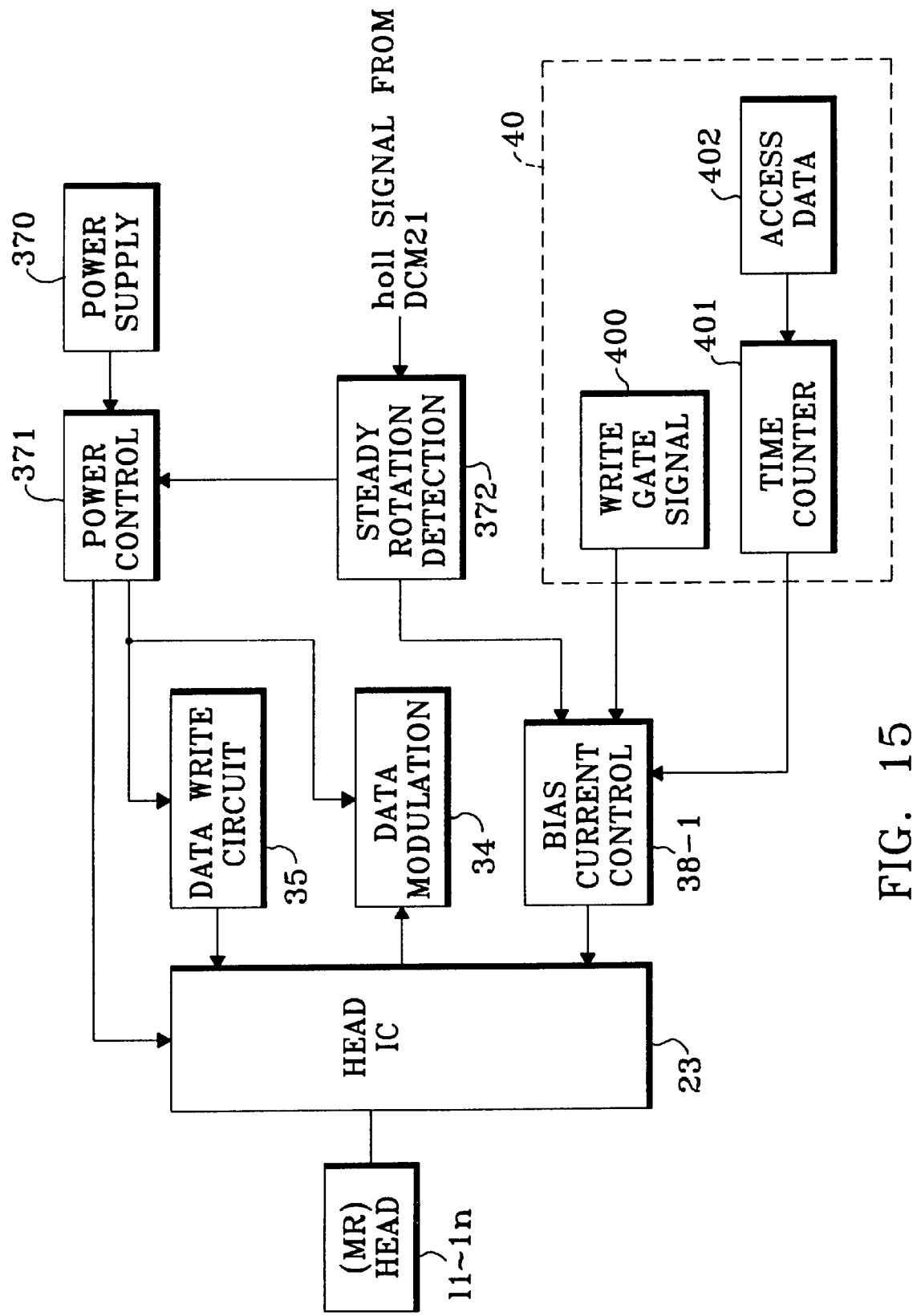
FIG. 15 is a block diagram showing control of a power supply.
Figure 16:
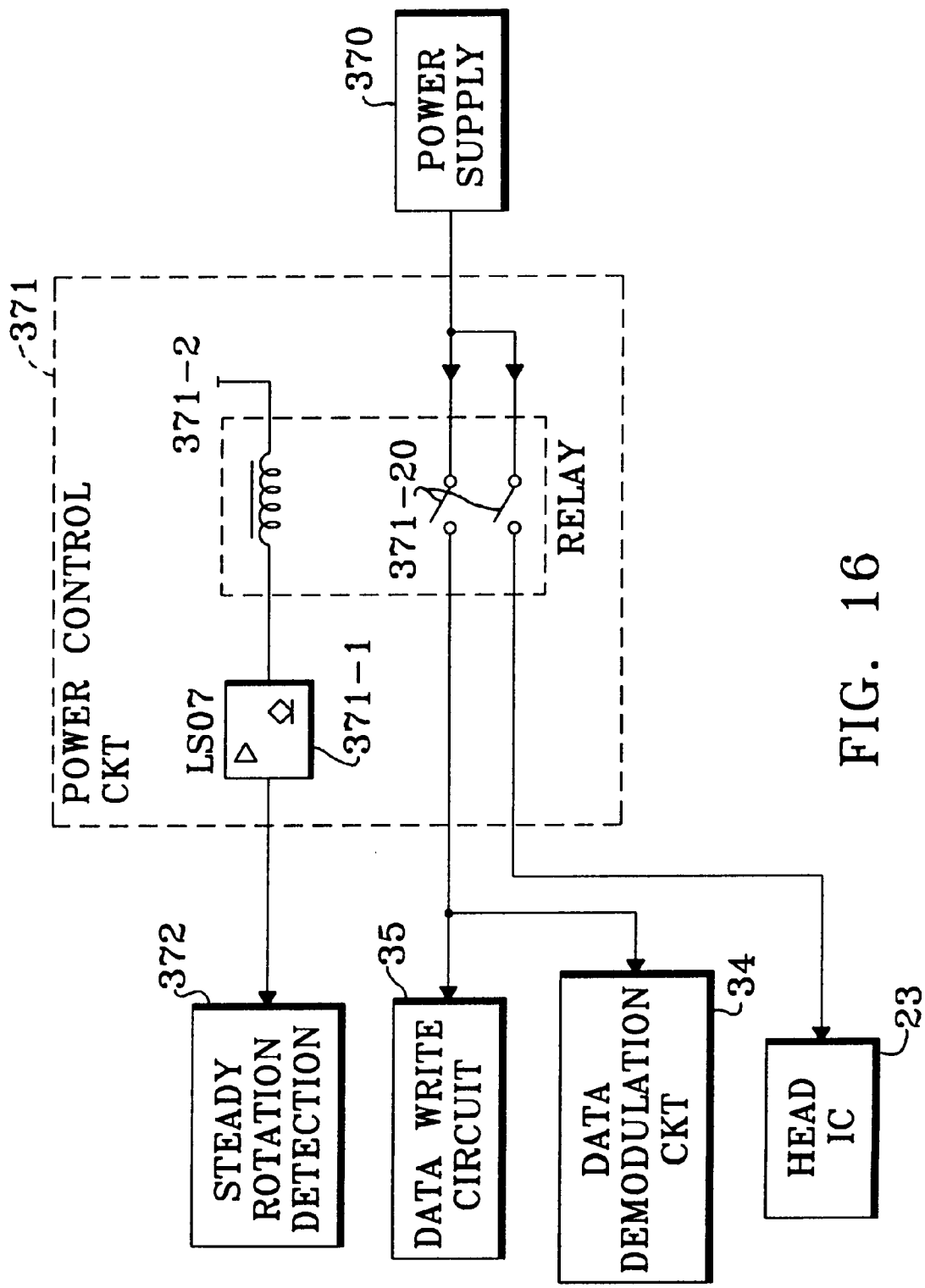
FIG. 16 is a circuit diagram of a power supply control circuit of FIG. 15.
Figure 17:
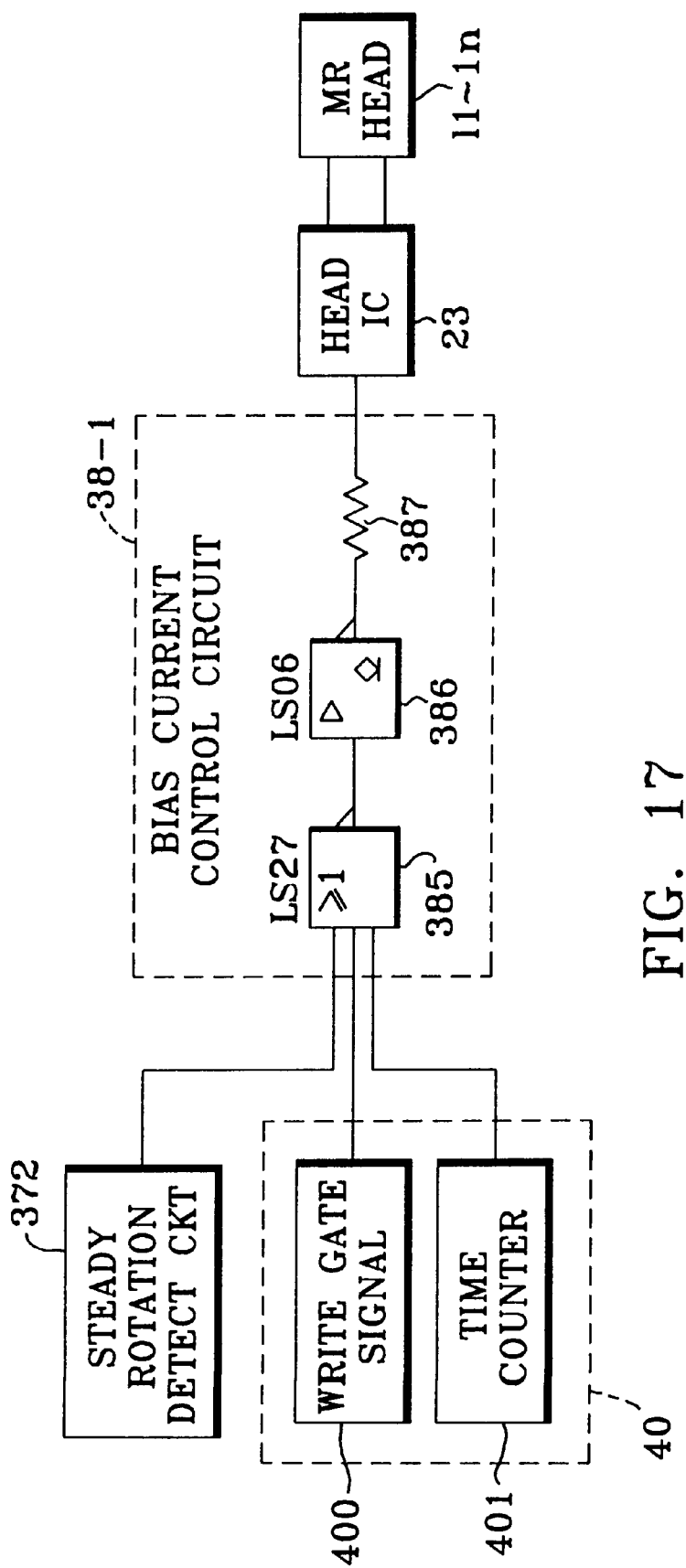
FIG. 17 is a circuit diagram of a bias current control circuit of FIG. 15.

FIG. 15 is a block diagram showing the power supply control. FIG. 16 is a circuit diagram of a power supply control circuit. FIG. 17 is a circuit diagram of the bias current control circuit of FIG. 15.

In some of the conventional magnetic disk units, the electric power is supplied to the data write circuit, the data demodulation circuit and the head IC simultaneously with the power-ON. Also, during a period from the power-ON to the time when the spindle motor reaches steady rotations, during the data writing and in the case where a non-access time to the apparatus continues long, the read operation is not effected, and, nevertheless, the bias current is made to flow across the MR head.

On the other hand, before the spindle motor reaches the steady rotations, the data is neither read nor written. Therefore, supplying the electric power in the meantime may cause an unnecessary dissipation of the electric power. Further, the head floats till the spindle motor reaches the steady rotations, and, consequently, a difference in electric potential between the MR head and the magnetic disc occurs. With this occurrence, energizing or discharging takes place between the MR head and the magnetic disc, resulting in a reduction in terms of a life-span of the head due to a destruction of the MR head.

Furthermore, if the bias current continues to flow unnecessarily, there are caused the decrease in the life-span of the head due to the deterioration of the MR head and a decline in terms of an output characteristic of the MR head.

In this embodiment, after the spindle motor has reached the steady rotations, the electric power is supplied, thereby preventing such troubles.

Referring to FIG. 15, a power supply 370 supplies the electric power. A power supply control circuit 371 controls the supply of the electric power from the power supply 370 to the head IC 23, the data write circuit (encoding/decoding circuit) 35 and the data demodulation circuit 34. The power supply control circuit 371 will hereinafter be explained referring to FIG. 16. A steady rotation detection circuit 372 measures a time-interval of a holl signal generated per rotation of the spindle motor 21 and thus detects whether or not the spindle motor 21 reaches the steady rotations.

A bias current control circuit 38-1 controls the supply of the bias current of the MR head to the head IC 23 on the basis of a steady rotation detection output of the steady rotation detection circuit 372, a write gate signal generator 399 of the processor 40 and a status signal when there is no access between a predetermined time interval. The bias current control circuit 38-1 will hereinbelow explained with reference to FIG. 17.

As illustrated in FIG. 16, the power supply control circuit 371 includes a drive circuit 371-1 for effecting a drive in response to the steady rotation detection signal of the steady rotation detection circuit 372 assuming a low level after detecting the steady rotations. The power supply control circuit 371 also includes a relay 371-2, having a coil driven by an output of the drive circuit 371-1, for connecting the data write circuit 35, the data demodulation circuit 34 and the head IC 23.

As depicted in FIG. 17, the bias current control circuit 38-1 has a NOR circuit 385, an inverter circuit 386 and a resistor 387. The NOR circuit 385 ORs the steady rotation detection signal of the steady rotation detection circuit 372 assuming the low level after detecting the steady rotations with the write signal assuming a high level during the data writing and the non-access status signal assuming the high level when there is no access between a predetermined time interval. The NOR circuit 385 then outputs an inverse output thereof. The resistor 387 serves as a resistor Rc of the head drive circuit 23-1 of the head IC 23 that is shown in FIG. 14.

This operation will be discussed. The steady rotation detection circuit 372 measures the time-interval of the holl signals of the spindle motor 21. Then, the steady rotation detection circuit 372, if the time-interval of the holl signals is not uniform, determines this as a non-steady rotation and therefore outputs a high-level steady rotation detection signal. Whereas if uniform, the steady rotation detection circuit 372 determines this as the steady rotation and therefore outputs a low-level steady rotation detection signal.

As shown in FIG. 16, the magnetic disc unit is powered-ON, and no current flows across the coil of the relay 371-2 of the power supply control circuit 371 during the non-steady rotations till the spindle motor 21 reaches the steady rotations. For this reason, the switch 371-20 of the relay 371-2 is in an OFF-state, with the result that the electric power is not supplied to the data write circuit 35, the data demodulation circuit 34 and the head IC 23.

On the other hand, during the steady rotations when the spindle motor 21 reaches the steady rotations, the current runs across the coil of the relay 371-2 of the power supply control circuit 371. For this reason, the switch of the relay 371-2 is in an ON-state. The data write circuit 35, the data modulation circuit 34 and the head IC 23 are supplied with the electric power.

No unnecessary electric power is therefore supplied to the data write circuit 35 and the data modulation circuit 34, thus saving the electric power. Further, since the head IC 23 is not supplied with the unnecessary electric power, no voltage is supplied to the MR head till the spindle motor reaches the steady rotations. Consequently, the voltage is not supplied to the MR head in the course of the floating of the MR head, thereby making it possible to prevent the energizing or discharging between the MR head and the magnetic disc. The deterioration of the MR head can be thereby prevented.

Next, the processor 40 which includes a time counter 401 and access data 402 sets the write gate signal generator 399 at the high level during the data writing. Reversely when not in the data writing process, the processor 40 sets the write gate signal generator 399 at the low level. Also, the processor 40, if there is no access between the predetermined time interval, sets the non-access signal at the high level. Otherwise, the processor 40 sets the non-access signal at the low level.

As illustrated in FIG. 17, when satisfying one of conditions about whether or not the steady rotation detection signal is at the high level, whether or not the write gate signal is at the high level and whether or not the non-access signal is at the high level, no current flows through the resistor 387, and therefore no current runs across the MR head. That is, when the spindle motor does not reach the steady rotations, or during the data writing, or when there is no access between the predetermined time interval, the current does not run across the MR head On the other hand, when satisfying all the conditions of the steady rotation detection signal being at the low level, the write gate signal being at the low level and the non-access signal being at the low level, the current flows through the resistor 387, and hence the current runs across the MR head. That is, the current runs across the MR head when the spindle motor 21 reaches the steady rotations, when not in the data writing process and when there are some accesses between the predetermined time interval.

Accordingly, the bias current is not supplied to the MR head till the spindle motor reaches the steady rotations. Hence, no current is supplied to the MR head in the course of the floating of the head. It is therefore possible to prevent the energizing or discharging between the MR head and the magnetic disc. The deterioration of the MR head can be thereby prevented.

Figure 18:
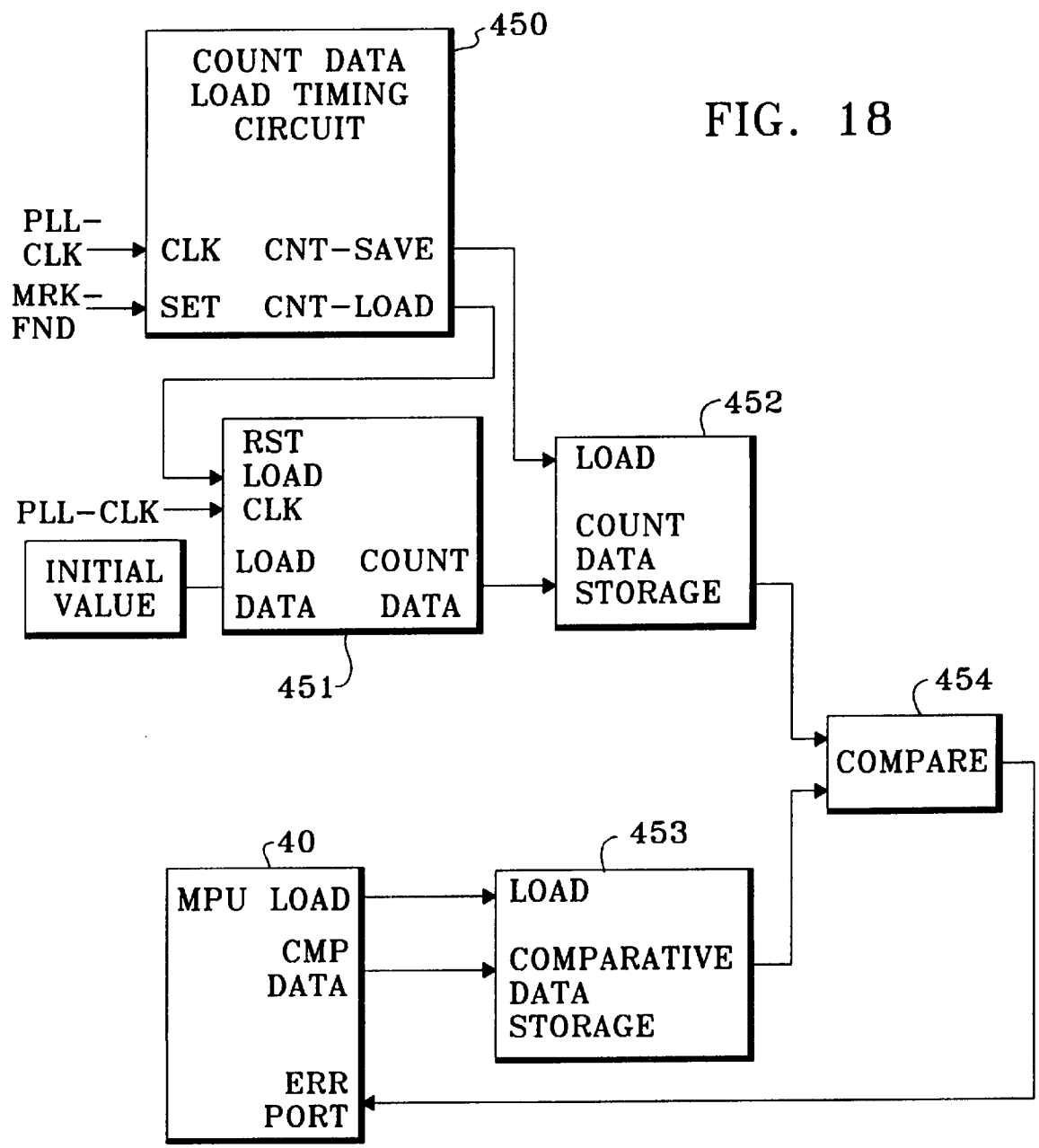
FIG. 18 is a block diagram illustrating a servo error detection circuit.
Figure 19A:
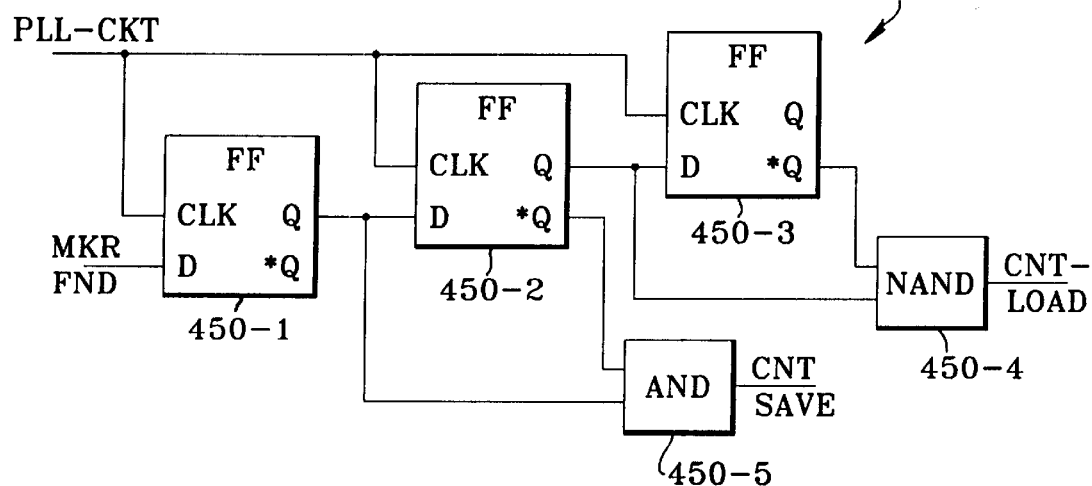
FIGS. 19A and 19B are circuit diagrams each showing the principal portion of FIG. 18.
Figure 19B:
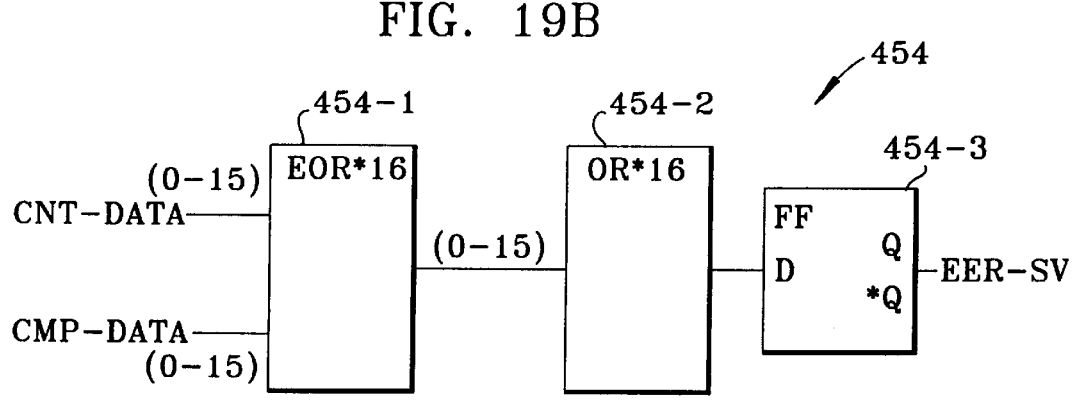

FIG. 18 is a block diagram illustrating a servo error detection circuit. FIGS. 19A and 19B are circuit diagrams each showing the principal portion of FIG. 18.

Known is a method of putting a marker to the top of a servo pattern on the servo surface of the magnetic disc. For example, 215 pieces of markers are provided when one track has 215 servo patterns. According to this method, immediately after a marker detection circuit has detected the marker from the servo data, a servo control system performs the processing.

If there is produced such an abnormality that the data stored on the servo surface are destructed by some cause, however, servo mal-processing is to be conducted because of the abnormal servo data. Consequently, there arises such a situation that the data are destructed, or there happens a trouble in which the control system is stopped.

In accordance with this embodiment, when the servo data are normal, the marker appear at a constant interval. Hence, the interval at which the markers appear is observed by detecting the markers, thus detecting a destruction of the servo data.

Paying attention to FIG. 18, a marker detection signal MKR-FND, upon a detection of the marker, changes from the low level to the high level. A count data load timing generation circuit 450, when the marker detection signal MRK-FND changes to the high level, synchronizes with a PLL clock PLL-CLK to change a counter save signal CNT-SAVE from the low level to the high level by one cycle of the PLL clock PLL-CLK. At the same time, the count data load timing generation circuit 450 changes a counter load signal CNT-LOAD from the high level to the low level by one cycle of the PLL clock PLL-CLK.

This count data load timing generation circuit 450 will be discussed in greater detail with reference to FIG. 19A. Note that the marker is detected by an unillustrated marker detection circuit incorporated into the communication IC 36 of FIG. 3. Also, the PLL clock PLL-CLK synchronizes with the data written on the servo surface.

A counter 451, when loaded with an initial value ([0]) in accordance with a counter load signal CNT-LOAD, counts the PLL clocks PLL-CLK. A counter data storage circuit 452 stores a count value of the counter 451 in accordance with a counter save signal CNT-SAVE.

A comparative data storage circuit 453 stores a marker interval given from the processor 40 as an item of comparative data. A comparing circuit 454 compares the storage data of the counter data storage circuit 452 with the storage data of the comparative data storage circuit 453. Then, the comparing circuit 454, if not coincident in the comparison, outputs a servo error signal ERR-SV to the processor 40. This comparing circuit 454 will be hereinafter described in greater detail with reference to FIG. 19B.

As illustrated in FIG. 19A, the count data load timing generation circuit 450 includes a first flip-flop 450-1 for being set the marker detection signal MKR-FND with the PLL clock PLL-CLK and a second flip-flop 450-2 for being set an output of the first flip-flop 450-1 with the PLL clock PLL-CLK. The count data load timing generation circuit 450 also includes a third flip-flop 450-3 for being set an output of the second flip-flop 450-2 with the PLL clock PLL-CLK and an AND gate 450-5 for AND-operating the first flip-flop 450-1 with the second flip-flop 450-2 and outputting the counter save signal CNT-SAVE and a NAND gate 450-4 for NAND-operating the second flip-flop 450-2 with the third flip-flop 450-3 and outputting the counter load signal CNT-LOAD.

Further, as shown in FIG. 19B, the comparing circuit 454 includes a 16-bit EOR circuit 454-1 for exclusive-OR-operating count data CNT-DATA of the count data storage circuit 452 with comparative data CMP-DATA of the comparative data storage circuit 453. The comparing circuit 454 also includes an OR circuit 454-2 for taking the OR of 16-bit data of the EOR circuit 454-1 and a flip-flop circuit 454-3 for latching an output of the OR circuit 454-2.

The operation thereof will be explained. The marker detection circuit detects the marker, whereby the marker detection signal MKR-FND changes to the high level. Hereat, the counter save signal CNT-SAVE changes to the high level in synchronism with the PLL clock PLL-CLK. With this processing, the count value of the counter 451 is set in the counter data storage circuit 452. Next, the counter load signal CNT-LOAD assumes the low level with a delay of one cycle of the PPL clock PLL-CLK. The counter 451 is thereby loaded with the initial value [0] and counts the PLL clocks PLL-CLK from the initial value.

The comparing circuit 454 compares the respective bits of the count data of the counter data storage circuit 452 with the bits of the comparative data of the comparative data storage circuit 453. Then, the comparing circuit 454 detects that the comparison does not show the coincidence and therefore outputs the servo error signal ERR-SV.

The processor 40 monitors the servo error signal ERR-SV from the comparing circuit 454 and, when this servo error signal ERR-SV falls, determines that the servo error occurs. Based on this determination, the servo error processing is carried out. For instance, the servo control is stopped, and there is taken such an action as to inform the host machine of the above-mentioned.

Thus, the abnormality of the data on the servo surface is detected by observing the marker appearing interval by making use of the markers provided at the equal intervals on the servo surface. Accordingly, the servo error can be quickly detected. With this detection, a malfunction of the apparatus can be prevented at an early stage.

Figure 20:
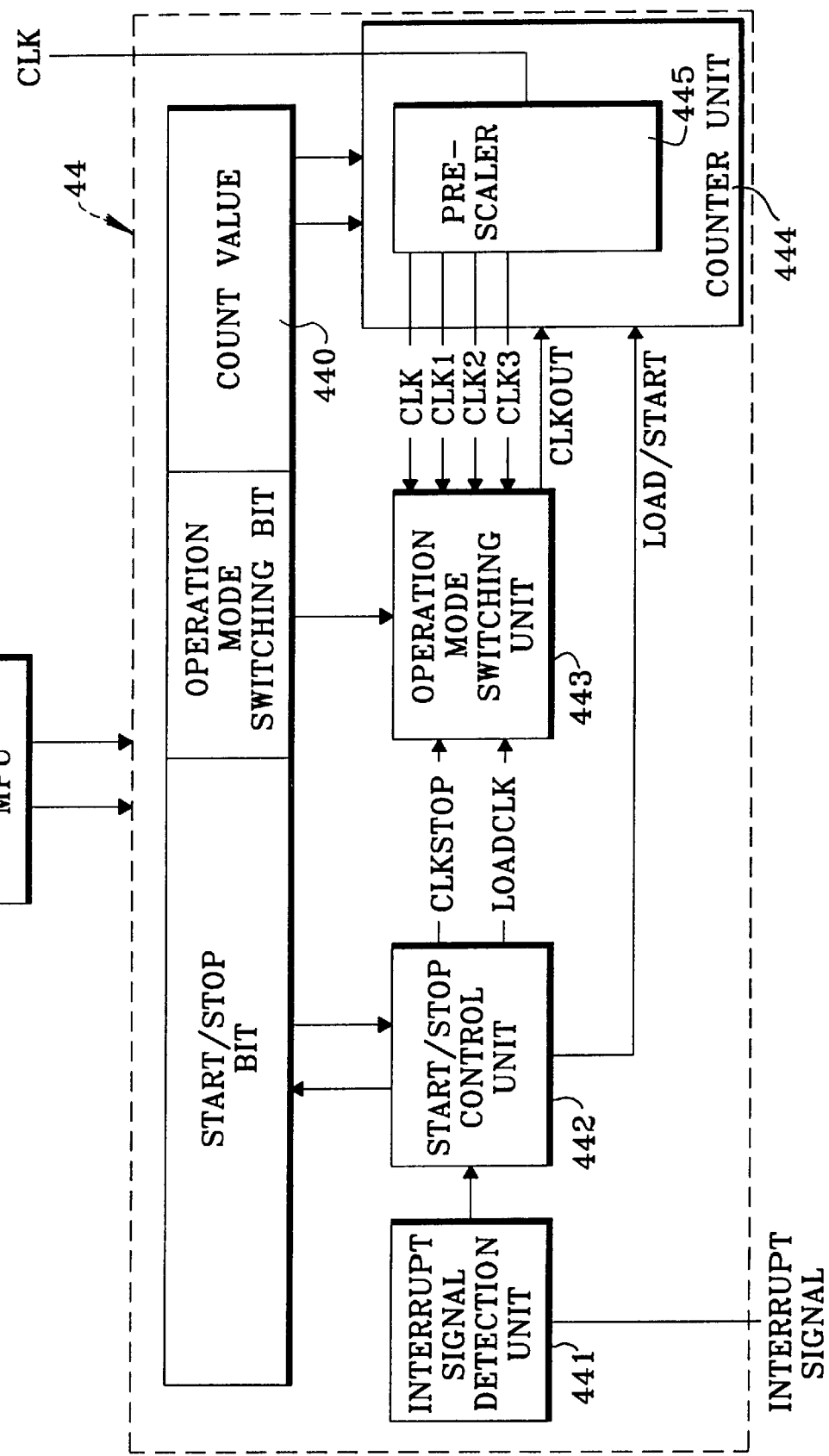
FIG. 20 is a block diagram illustrating a timer circuit.
Figure 21:
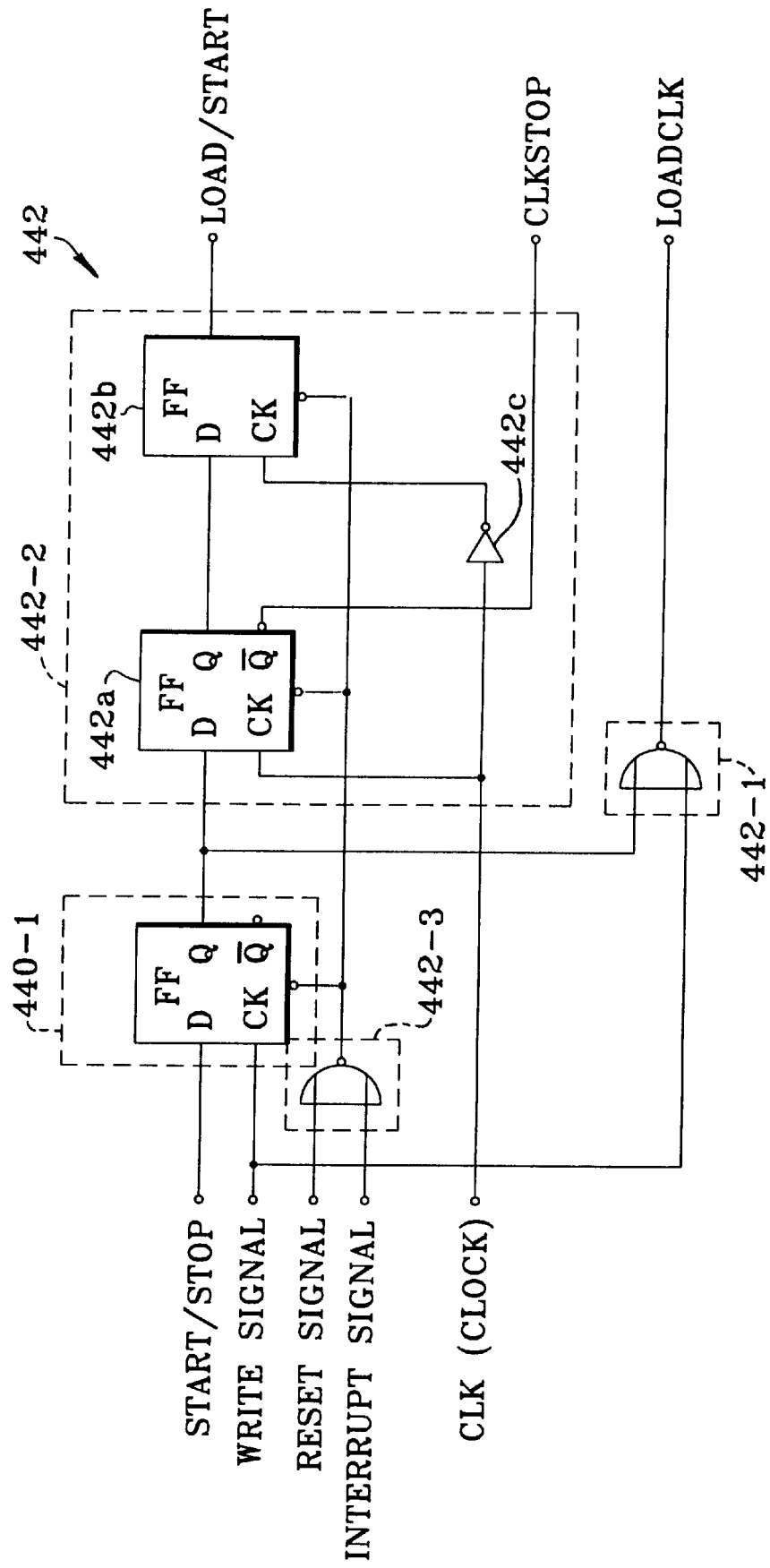
FIG. 21 is a circuit diagram of a start/stop control circuit of FIG. 20.
Figure 22:
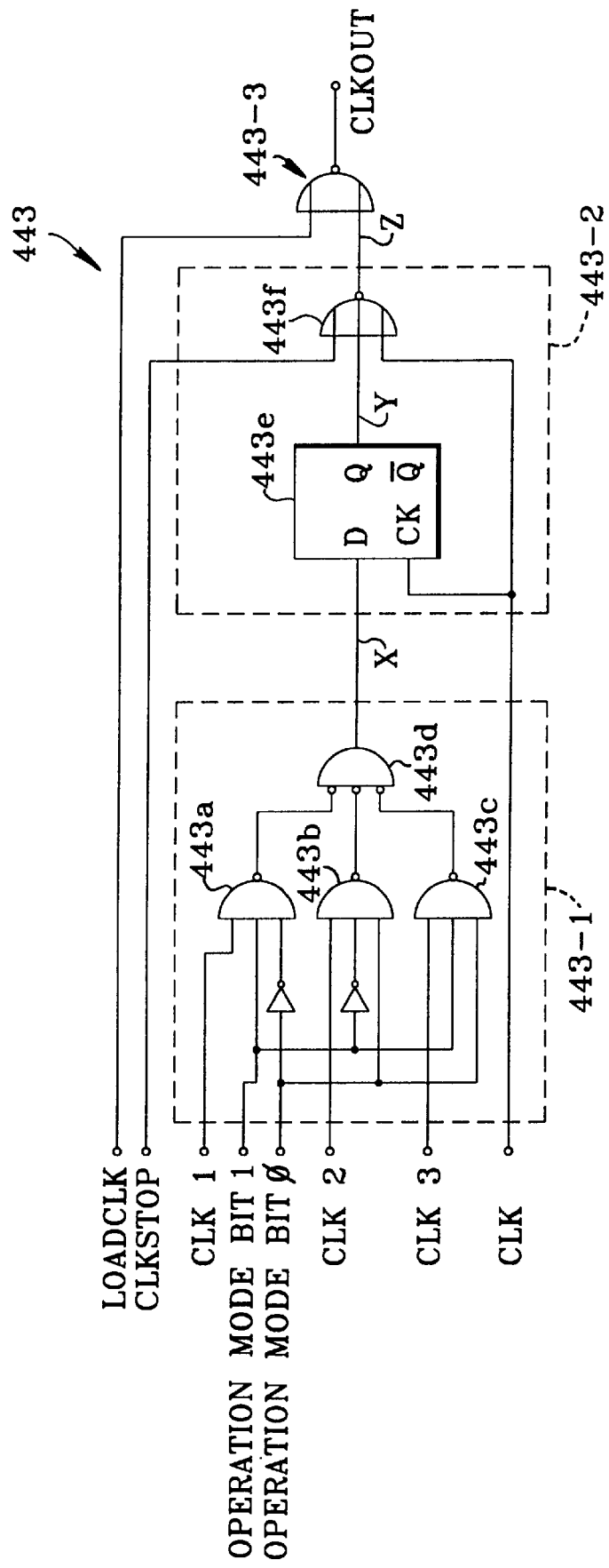
FIG. 22 is a circuit diagram of an operation mode switching circuit of FIG. 20.
Figure 25:
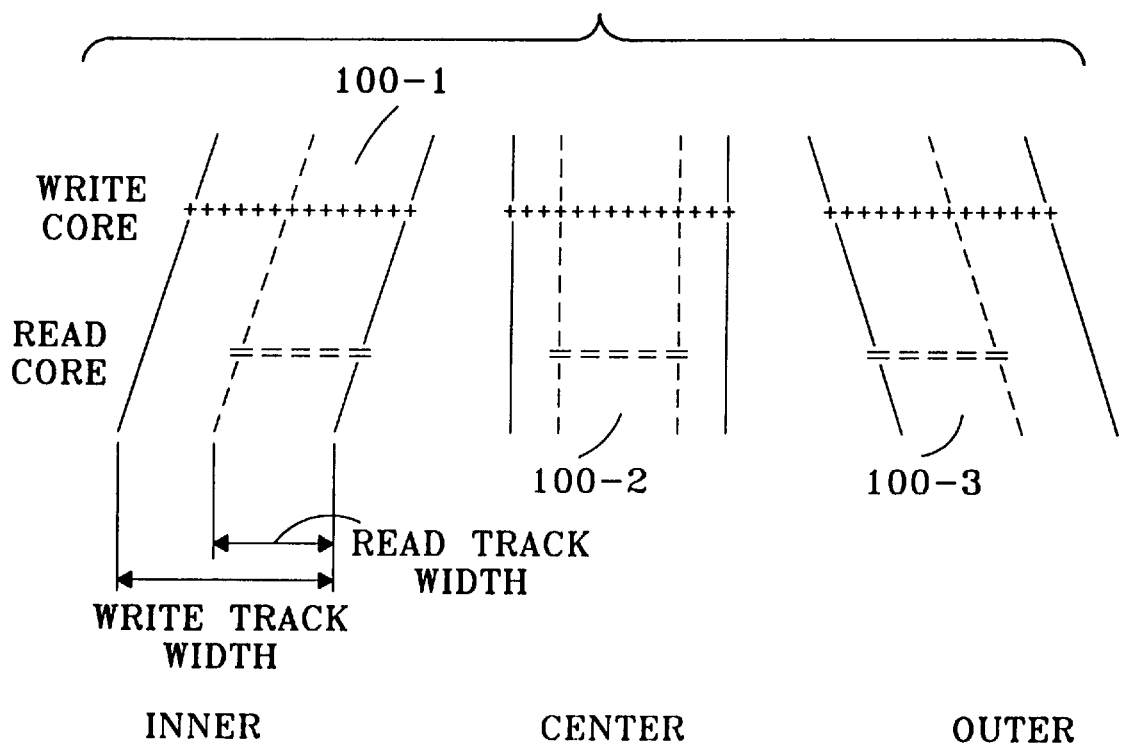
FIG. 25 is an explanatory diagram of a yaw angle.
Figure 26:
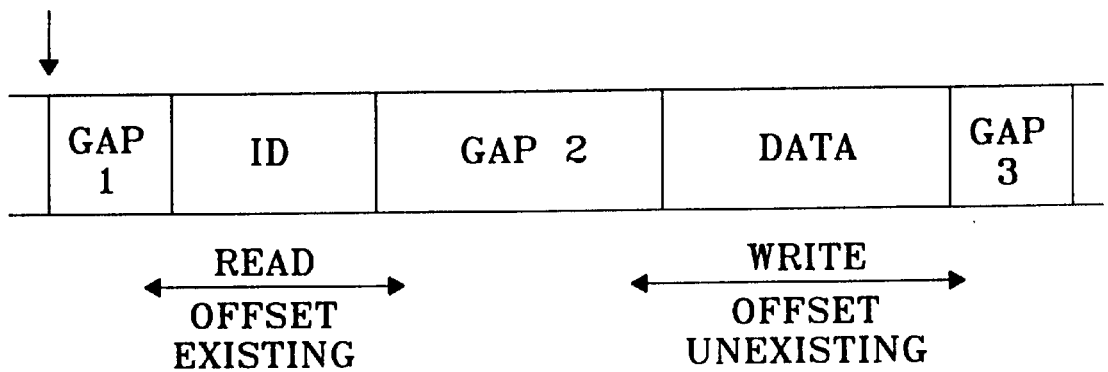
FIG. 26 is a diagram of assistance in explaining a data format of a magnetic disc.

FIG. 20 is a block diagram of a timer circuit. FIG. 21 is a circuit diagram of a start/stop control circuit of FIG. 20. FIG. 22 is a circuit diagram of an operation mode switching circuit of FIG. 20. FIG. 23 is a time chart of the circuit of FIG. 22.

In general, a timer circuit 44 for measuring a certain specific time is utilized because of the processor 40. In the conventional timer circuit, after setting the count value in the register, the start is designated by a start/stop bit. In this case, two kinds of processes are needed at the minimum for starting the timer.

Further, the timer does not incorporate a function to detect an interrupt signal, and, even if the interrupt signal is asserted, the timer is timed out without stopping the timer.

For this reason, as the two processes are required at the minimum for starting the timer, the processor 40 for controlling the whole timer is burdened with this. Therefore, even if the timer is constructed of the hardware, it takes much time to operate the timer.

Similarly, even when detecting the interrupt signal, there is no function to stop the timer. Hence, even if the interrupt signal is asserted, the timer is timed out, and the processor 40 is notified of the interrupt signal. The processor 40 is therefore required to perform the processing of the interrupt signal from the timer, resulting in an augment in terms of the burden on the processor 40.

This embodiment provides the timer circuit for actualizing the timer function with a minimum burden on the processor 40.

As illustrated in FIG. 20, the timer 44 includes a register 440, an interrupt signal detection circuit 441, a start/stop control circuit 442, an operation mode switching circuit 443 and a counter circuit 444 having a prescaler 45.

Set in the register 440 are a count value from the processor 40, an operation mode switching bit and a start/stop bit. The interrupt detection circuit 441 detects the interrupt signal and indicates the start/stop control circuit 442 to stop the timer. The start/stop control circuit 442 controls the start/stop of the timer on the basis of the start/stop bit set in the register 440.

The operation mode switching circuit 443 controls the switching of the operation mode of the timer on the basis of the operation mode switching bit set in the register 440. The counter circuit 444 reads the count value set in the register 440 and decrements this value to send it back to the register. The prescaler 445 divides a frequency of a clock CLK given from the outside, thereby generating various clocks CLK, CLK1, CLK2, CLK3.

The start/stop control circuit 442 will be explained with reference to FIG. 21. A start/stop indication from the processor 40 is set in a start/stop bit flip-flop 440-1 of the register 440 in response to a write signal from the processor 40. A NOR circuit 442-1, when the start/stop bit is set in the flip-flop 440-1, synchronizes with the write signal and outputs a load clock LOADCLK.

A signal generation circuit 442-2 includes a first flip-flop 442a in which a Q-output of the flip-flop 440-1 is set, an inverter circuit 442c for inverting the clock CLK and a second flip-flop 442b in which the Q-output of the first flip-flop 442a is set in accordance with the clock CLK of the inverter circuit 442c.

In this circuit, a clock stop signal CLKSTOP is outputted from the inverted Q-output of the first flip-flop 442a. Further, a load/start signal LOAD/START outputted from the second flip-flop 442b synchronizes with the clock CLK and is then outputted with a delay behind the write signal.

A NOR circuit 442-3 NOT-OR-OPERATES a reset signal from the processor 40 with an interrupt signal from the interrupt circuit 441. With this processing, there are reset the flip-flop 440-1 of the register 440 and two flip-flops 442a, 442b of the signal generation circuit 442-2.

Next, the operation mode switching circuit 443 will be described with reference to FIGS. 22 and 23. As illustrated in FIG. 22, a clock selection circuit 443-1 is constructed of gate groups 443a–443d for selecting one of the three clocks CLK1, CLK2, CLK3 frequency-divided by the prescaler 445 in accordance with the 2-bit operation mode bits. An output thereof goes as indicated by [X] in FIG. 23.

A synchronous circuit 443-2 has a flip-flop 443e for setting an operation clock selected by a clock selection circuit 443-1 on the basis of the clock CLK. The synchronous circuit 443-2 also has a NOR circuit 443f for NOR-operating the above clock stop signal CLKSTOP with an output of the flip-flop 443e and the clock CLK. In this circuit, the operation clock (indicated by [Y] in FIG. 23) synchronizing with the clock is outputted, and, at the same time, the processor 40, when making a stop designation, stops the output of the operation clock.

A NOR circuit 443-3 NOR-operates the operation clock from the synchronous circuit 443-2 with the load clock signal LOADCLK and outputs a clock signal CLKOUT (shown in FIG. 23) of the counter 444.

The operation thereof will be explained. The processor 40, for operating the timer, writes the start/top bit to the register 440 (flip-flop 440-1) with a start designation. Hereat, the NOR circuit 442-1 outputs the load clock signal LOADCLK to the operation mode switching circuit 443. In the operation mode switching circuit 443, as discussed above, the clock signal for the counter 444 is generated. Further, in the signal generation circuit 442-2, a load/start signal LOAD/START is generated with a delay behind the write signal to the register 440.

For this reason, while the load/start signal LOAD/START remains at the low level, the load clock signal LOADCLK is inputted as a clock signal CLKOUT to the counter 444. The counter 444 is brought into a load status when the load/start signal LOAD/START is at the low level, and when the clock signal CLOCKOUT is at the high level. Accordingly, the count value of the register 440 is loaded in the counter 444. Next, when the load/start signal LOAD/START assumes the high level, the counter 444 comes into a countable status. The counter 444 therefore down-counts the clock signals CLKOUT.

Thus, even if the processor 40 simultaneously sets the count value and the start designation, the timer is operable.

Next, the processor 40, for the purpose of switching the operation mode of the timer, sets the count value, the operation mode and the start/stop bit. In addition to the above-mentioned operations, the clock selection circuit 443-1 selects a clock employed in the counter 444 from the operation mode switching bits of the register 440 and outputs it as the clock signal CLKOUT. Accordingly, even when the processor 40 sets the count value, the start designation and the operation mode setting bit, the timer is operable.

Next, when the processor 40 designates the stop, the flip-flop 442a of the start/stop control circuit 442 is reset. With this resetting, the clock stop signal CLKSTOP assuming the high level is outputted, and, hence, the output of the synchronous circuit 443-2 of the operation mode switching circuit 443 still remains at the high level. For this reason, the clock supply to the counter 444 is stopped.

Therefore, even when the processor 40 designates the stop, the count values obtained so far are left, and the timer can be stopped.

Similarly, when the interrupt signal or the reset signal comes in, the flip-flop 442a is reset by the NOR circuit 442-3 of the start/stop control circuit 442. With this resetting, the clock stop signal CLKSTOP assuming the high level is outputted, so that the output of the synchronous circuit 443-2 of the operation mode switching circuit 443 keeps the high level. Consequently, the clock supply to the counter 444 is stopped.

Accordingly, even when the interrupt signal comes in, the count values obtained so far are left, the timer can be stopped. This makes it possible to relieve the burden on the processor 40 due to the time-out. Further, the reset signal is also supplied to the counter 444, and, therefore, when the reset signal comes in, the counter 444 is also reset.

In this manner, the timer value is loaded in the interior of the timer, thus generating the signal for starting. Hence, the processor is capable of starting or stopping the time by the single instruction. This makes a large contribution to the relief of the burden on the processor.

In accordance with the embodiments of FIGS. 7 and 9 other than the embodiments discussed above, the read head is composed of the MR element, while the write head is composed of the inductive element. However, other heads are also applicable, wherein the read head and the write head are separated.

The present invention has been discussed above by way of the embodiments. However, a variety of modifications can be effected within the range of the gist of the present invention but are not excluded from the scope of the present invention.

As discussed above, according to the present invention, first, the yaw angle correction is performed either in the read seek or in the write seek. It is therefore possible to enhance the read performance of the read head.

Second, since the optimal bias current of the read head is automatically measured, the bias current with a less amount of errors can be set, thereby making it feasible to enhance the read performance of the read head.

Third, the supply of the electric power to the read head is controlled, and hence the read head can be prevented from being deteriorated as well as enhancing the performance of the read head.

Fourth, as the servo error is detected at the early stage, the restoration when the servo error occurs can be facilitated.

What is claimed is:

1. A method of controlling a magnetic disc drive including: a magnetic disc, a magnetic head having a write head for writing data to said magnetic disc and a read head for reading the data from said magnetic disc, and a rotary type actuator for locating said magnetic head in a desired track position on said magnetic disc, said method comprising:
   a step of calculating a distance to a designated target track for a seek operation;
   a step of calculating a yaw angle offset quantity between said write head and said read head in accordance with one of the write instruction and the read instruction;
   a step of calculating a total moving quantity by adding the calculated distance and the calculated yaw angle offset quantity; and
   a step of executing a seek operation using the total moving quantity, whereby after the seek operation said magnetic head is located in a first position where the write head is positioned on a center of the target track in accordance with the write instruction, and said magnetic head is located in a second position where the read head is positioned on a center of the target track in accordance with the read instruction.

2. A method of controlling a magnetic disc drive according to claim 1, wherein said read head is constructed of a magnetoresistance type element.

3. A method for controlling a magnetic disk drive according to claim 1, wherein
   when executing a write instruction:
      said yaw angle offset quantity calculating step is not executed; and
      said total moving quantity of the seek is based on only said calculated distance; and
   when executing a read instruction:
      said yaw angle offset quantity calculating step is executed; and
      said total moving quantity of the seek is calculated based on both the calculated distance and said yaw angle offset quantity.

4. A method for controlling a magnetic disk drive according to claim 1, wherein said step of calculating a yaw angle offset quantity includes a step of obtaining the yaw angle offset quantity that is measured so as to maximize a read margin of said read head.

5. The method for controlling a magnetic disk drive according to claim 1, wherein said step of calculating a yaw angle offset quantity includes a step of obtaining the yaw angle offset quantity in accordance with designated target track position.

6. The method for controlling a magnetic disk drive according to claim 1, wherein said step of calculating a yaw angle offset quantity includes a step of obtaining the yaw angle offset quantity from a memory.

7. An apparatus for controlling a magnetic disc drive including: a magnetic disc, a magnetic head having a write head for writing data to said magnetic disc and a read head for reading the data from said magnetic disc, and a rotary type actuator for locating said magnetic head in a desired track position on said magnetic disc, said apparatus comprising:
   a first control circuit for indicating a seek to a designated target track in accordance with one of a write instruction and a read instruction; and
   a second control circuit for calculating a distance to a designated target track position for a seek operation, calculating a yaw angle offset quantity between said write head and said read head in accordance with one of the read instruction or the write instruction, calculating a total moving quantity by adding the calculated distance and the calculated yaw angle offset quantity, and seek-controlling said rotary type actuator in accordance with the total moving quantity for locating said magnetic head in a first position where the write head is positioned on a center of the target track in accordance with the write instruction and in a second position where the read head is positioned on a center of the target track in accordance with the read instruction.

8. An apparatus for controlling a magnetic disc drive according to claim 7, wherein said read head is constructed of a magnetoresistance type element.

9. An apparatus for controlling a magnetic disk drive according to claim 7, wherein when executing a write instruction:
said second control circuit does not calculate said yaw angle offset quantity; and
said second control circuit calculates said total moving quantity based on only said calculated distance; and when executing a read instruction:
said second control circuit calculates said yaw angle offset quantity; and
said second control circuit calculates said total moving quantity of the seek is calculated based on both the calculated distance and said yaw angle offset quantity.

10. The apparatus for controlling a magnetic disk drive according to claim 7, wherein said second control circuit obtains the yaw angle offset quantity that is measured so as to maximize a read margin of said read head.

11. The apparatus for controlling a magnetic disk drive according to claim 7, wherein said second control circuit obtains the yaw angle offset quantity in accordance with designated target track position.

12. The apparatus for controlling a magnetic disk drive according to claim 7, wherein said second control circuit obtains the yaw angle offset quantity from a memory.

* * * * *

UNITED STATES PATENT AND TRADEMARK OFFICE
CERTIFICATE OF CORRECTION

PATENT NO.   : 5,956,200
DATED        : September 21, 1999
INVENTOR(S) : Kohno et al.

It is certified that error appears in the above-identified patent and that said Letters Patent is hereby corrected as shown below:

Column 24, line 5, after "seek" delete "is calculated"

Signed and Sealed this

Nineteenth Day of December, 2000

Attest:

Q. TODD DICKINSON

Attesting Officer

Commissioner of Patents and Trademarks